United States Patent
Takai

(10) Patent No.: US 8,640,111 B2
(45) Date of Patent: Jan. 28, 2014

(54) FILE CONVERSION DEVICE, FILE CONVERSION METHOD, AND FILE CONVERSION PROGRAM

(75) Inventor: Shinji Takai, Tokyo (JP)

(73) Assignee: NEC Corporation, Tokyo (JP)

( * ) Notice: Subject to any disclaimer, the term of this patent is extended or adjusted under 35 U.S.C. 154(b) by 804 days.

(21) Appl. No.: 12/773,359

(22) Filed: May 4, 2010

(65) Prior Publication Data

US 2010/0287540 A1    Nov. 11, 2010

(30) Foreign Application Priority Data

May 11, 2009  (JP) .................................. 2009-114854
Feb. 16, 2010  (JP) .................................. 2010-031408

(51) Int. Cl.
*G06F 9/45*     (2006.01)

(52) U.S. Cl.
USPC .......................................... 717/137; 717/144

(58) Field of Classification Search
None
See application file for complete search history.

(56) References Cited

U.S. PATENT DOCUMENTS

| | | | | |
|---|---|---|---|---|
| 6,031,993 | A  * | 2/2000 | Andrews et al. | 717/136 |
| 6,651,241 | B1 * | 11/2003 | Hernandez, III | 717/112 |
| 2004/0205058 | A1 * | 10/2004 | Kiji | 707/3 |
| 2005/0039173 | A1 * | 2/2005 | Tondreau et al. | 717/136 |
| 2005/0251812 | A1 * | 11/2005 | Hayward | 719/328 |
| 2006/0236224 | A1 * | 10/2006 | Kuznetsov et al. | 715/513 |
| 2009/0138491 | A1 * | 5/2009 | Chowdhury | 707/100 |

FOREIGN PATENT DOCUMENTS

| | | |
|---|---|---|
| JP | 07-248915 A | 9/1995 |
| JP | 08-016378 A | 1/1996 |
| JP | 11-024913 A | 1/1999 |

* cited by examiner

*Primary Examiner* — Elias Mamo

(57) ABSTRACT

Provided is a file conversion device which converts a file form written in a given language to a file form that can be interpreted by another language, which includes: a file readout device which reads description contents of an inputted file by each line, and manages the description contents by adding an index to each line of the read description contents; a syntax tree creating device which converts the description contents into a syntax tree of a tree structure based on the indexes through linearly scanning the indexes of the file managed by the file readout device; a syntax tree optimizing device which optimizes the tree structure of the syntax tree as a flowchart according to an optimization rule; and a file dividing device which divides the inputted file by having controllers in the flowchart optimized by the syntax tree optimizing device as identifiers.

6 Claims, 23 Drawing Sheets

```
struct tree {
    char index[ ];        ← 102b
    struct tree *left;
    struct tree *right;
    char *line;
}
```

FILE CONVERSION DEVICE, FILE CONVERSION METHOD, AND FILE CONVERSION PROGRAM

CROSS-REFERENCE TO RELATED APPLICATION

This application is based upon and claims the benefit of priority from Japanese patent applications No. 2009-114854, filed on May 11, 2009 and No. 2010-031408, filed on Feb. 16, 2010, the disclosure of which is incorporated herein in its entirety by reference.

BACKGROUND OF THE INVENTION

1. Field of the Invention

The present invention relates to transition of a mainframe of a computer to an open system. More specifically, the present invention relates to a technique for converting a job written in JCL for a mainframe to a job network for an open system.

2. Description of the Related Art

Recently, many business firms are actively making transitions from the mainframe that has been used to open systems using general-purpose OS such as UNIX (registered trademark) and Windows (registered trademark) in order to cut TCO (Total Cost of Ownership) that is the cost required for maintenance and operation of computer systems used for the business transactions. For that, it is necessary to convert jobs written in "Job Control Language" (referred to as JCL hereinafter) which is used to be operated on the mainframe into a job network (flowchart and divided JCL files) for open systems, and then to convert those into a script file.

FIG. 22 is an explanatory diagram showing an example of a job network. FIG. 22A-FIG. 22D are all flowcharts which illustrate the same sequential relations. In most of typical job management tools, there is no restriction set in terms of descriptions so as to allow users to write the jobs in any writing styles. However, with such systems, flowcharts may often become different as in FIG. 22A-FIG. 22D depending on personal habits of the users even for the flowcharts expressing the same sequential relation. To have mixtures of various flowcharts in different forms but showing the same sequential relation may results in inefficiency when conducting tests at the time of transition of the jobs, maintenance after the transitions, and the like.

In the flowchart shown in FIG. 22A, for overcoming such issue, a start point and an end point are fixed in advance, and the way of drawing the line of flowchart is limited on the many-purpose job management software side. With this, the flowcharts come to be in a same form no matter who draws the flowchart. Thus, it is possible to create a simple job network flow of high maintenance property. When transiting the business system from the mainframe to the open system, the JCL file is converted into a job network (flowchart and divided JCL files), and then converted to a script file by using such job management software.

As a technique related to this, there are following patent documents. Japanese Unexamined Patent Publication Hei 07-248915 (Patent Document 1) discloses a technique generates a syntax tree by parsing a program, and relates declaration, assignments, and the like for each data name to the data use conditions. Japanese Unexamined Patent Publication Hei 08-016378 (Patent Documents 2) discloses a technique which parses a program, extracts blocks configured with a series of statements not including divergence, and expresses those hierarchically along with the divergence and merging sections. Japanese Unexamined Patent Publication Hei 11-024913 (Patent Document 3) discloses a technique which sorts out a program written in JCL by a line unit, and then converts it into a program of another form.

However, there are parallel execution instruction such as a sentence "¥SUBJOB - - - ¥ENDSUBJOB" and an order control instruction such as a sentence "¥WHEN - - - JUMP" sentence (if - - - goto) in JCL. Depending on the sense of the creator, those instructions may be used frequently. FIG. 23 is an explanatory diagram showing an example of a JCL file in which such parallel execution instructions and order control instructions are used frequently.

When such parallel executions instruction and order control instructions are used in JCL file frequently as shown in FIG. 23, it is difficult to grasp the accurate sequential relation from the line numbers. Thus, it becomes difficult to convert the file into a flowchart mechanically by utilizing an automatic conversion tool or the like. Even if it can be done, a complicated job network of low maintenance property may be generated.

Therefore, conversion of such JCL file to a job network has mainly been done manually. This requires a great deal of labor, and the quality of the created job network depends on the skill of the worker. Further, this my causes increase in the cost due to the degradation in the quality generated by human errors and due to the recovery work thereof.

If the JCL does not contain the parallel execution instructions or the order control instructions, conversion from the JCL file to the job network can be done easily. Therefore, if it is possible to detect the parallel execution instructions and the order control instructions from the JCL file and create a flowchart, and possible to divide the JCL file by excluding the parallel execution instructions or the order control instructions, the aforementioned issue can be overcome. However, Patent Documents 1-3 mentioned above do not disclose such techniques for dividing the JCL file, so that it is not possible with those to overcome this issue.

SUMMARY OF THE INVENTION

An exemplary object of the present invention is to provide a file conversion device, a file conversion method, and a file conversion program, which are capable of creating a simple job network of high maintenance property by effectively performing conversion of a JCL file into a job network.

In order to achieve the foregoing exemplary object, the file conversion device according to an exemplary aspect of the invention is a file conversion device which converts a file form written in a given language to a file form that can be interpreted by another language, and the device includes: a file readout device which reads description contents of an inputted file by each line, and manages the description contents by adding an index to each line of the read description contents; a syntax tree creating device which converts the description contents into a syntax tree of a tree structure based on the indexes through linearly scanning the indexes of the file managed by the file readout device; a syntax tree optimizing device which optimizes the tree structure of the syntax tree as a flowchart according to an optimization rule; and a file dividing device which divides the inputted file by having controllers in the flowchart optimized by the syntax tree optimizing device as identifiers.

In order to achieve the foregoing exemplary object, the file conversion method according to another exemplary aspect of the invention is a file conversion method for converting a file form written in a given language to a file form that can be interpreted by another language, and the method includes:

reading description contents of an inputted file by each line, and managing the description contents by adding an index to each line of the read description contents; converting the description contents into a syntax tree of a tree structure based on the indexes through linearly scanning the indexes of the managed file; optimizing the tree structure of the syntax tree as a flowchart according to an optimization rule; and dividing the inputted file by having controllers in the flowchart as identifiers.

In order to achieve the foregoing exemplary object, the file conversion program according to still another exemplary aspect of the invention is a file conversion program for causing a computer, which configures a file conversion device that converts a file form written in a given language to a file form that can be interpreted by another language, to execute: a function which reads description contents of an inputted file by each line, and manages the description contents by adding an index to each line of the read description contents; a function which converts the description contents into a syntax tree of a tree structure based on the indexes through linearly scanning the indexes of the managed file; a function which optimizes the tree structure of the syntax tree as a flowchart according to an optimization rule; and a function which divides the inputted file by having controllers in the flowchart as identifiers.

BRIEF DESCRIPTION OF THE DRAWINGS

FIGS. 2A and 2B show explanatory diagrams illustration flows of processing executed by a job network-to-flow conversion program shown in FIG. 1, in which FIG. 2A shows correspondence with respect to computer resources shown in FIG. 1 and FIG. 2B shows works done by each section and the flows of each file during the works in a more ideational manner;

DETAILED EXPLANATIONS OF THE PREFERRED EMBODIMENTS

Hereinafter, exemplary embodiments of the present invention will be described by referring to the accompanying drawings.

First, basic contents of the exemplary embodiment will be described, and more specific contents will be described thereafter.

Figure 1:
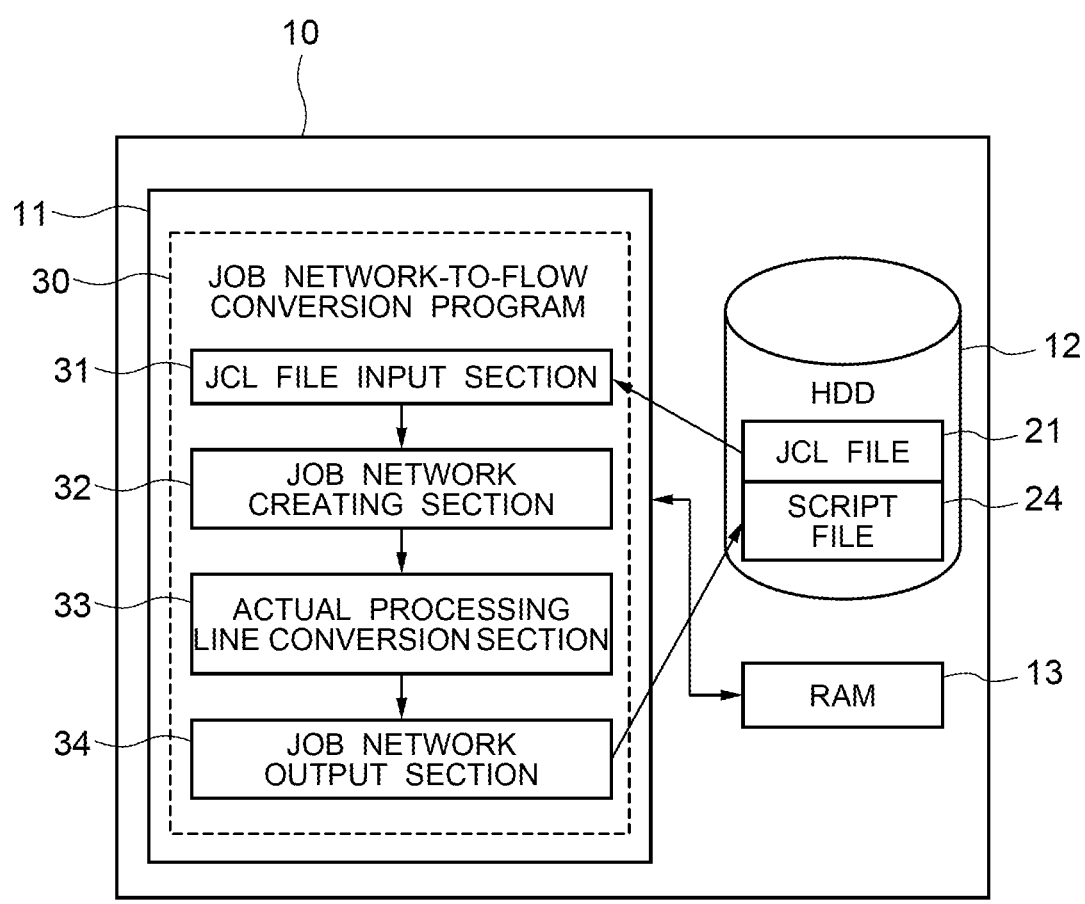
FIG. 1 is an explanatory diagram showing the structure of a job network-to-flow conversion device according to an exemplary embodiment.

A job network-to-flow conversion device 10 that is a file conversion device according to the exemplary embodiment is a file conversion device which converts inputted first file (JCL file 21) into a second file (script file 24). As shown in FIG. 1, this device includes: a file input section which inputs the first file (JCL file input section 31); a job network creating section 32 which creates a flowchart from the inputted first file, and divides the first file in a unit corresponding to the flowchart to create divided files; and an actual processing line conversion section 33 which creates the second file from the flowchart and the divided files.

Figure 3:
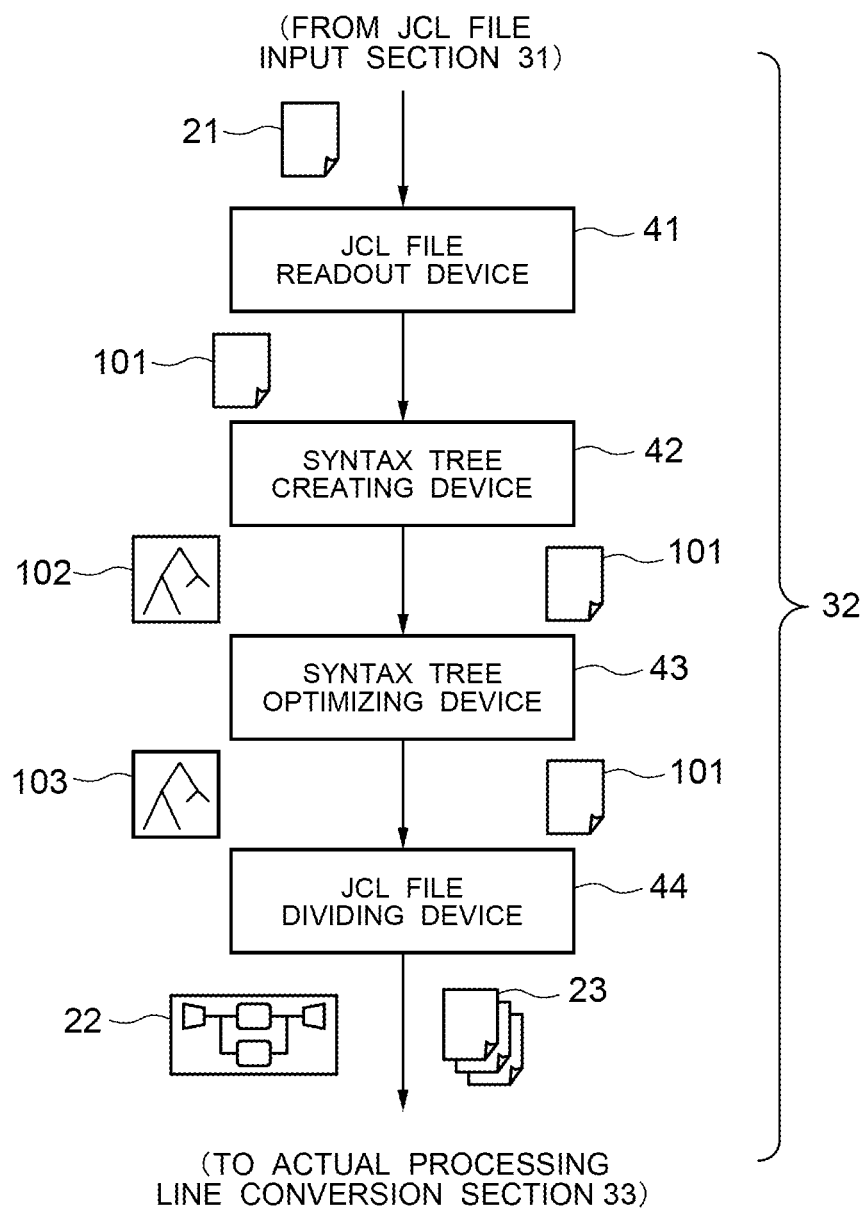
FIG. 3 is an explanatory diagram showing processing contents of an actual processing line conversion section shown in FIG. 2 in more details.

As shown in FIG. 3, the job network creating section 32 includes: a syntax tree creating device 42 which creates a syntax tree 102 from the first file; a syntax tree optimizing device 43 which optimizes the created syntax tree 102; and a file dividing device (JCL file dividing device 44) which creates a flowchart 22 from the optimized syntax tree, and creates divided files (divided JCL files 23) based on the flowchart. The syntax tree optimizing device 43 optimizes the syntax tree by searching divergence points according to the parallel execution instruction or the order control instruction of the syntax tree from the end of the syntax tree, judging whether or not the nodes diverged at the branching points are connectable, and connecting the nodes when the nodes are connectable.

The file input section (JCL file input section 31), the job network creating section 32, and the actual processing line conversion section 33 are built on software by having a CPU 11 execute a job network-to-flow conversion program 30. Similarly, the syntax tree creating device 42, the syntax tree optimizing device 43, and the file dividing device (JCL file dividing device 44) provided to the job network creating section 32 are built on software by having the CPU 11 execute the job network-to-flow conversion program 30. Further, the job network-to-flow conversion program 30 is recorded on a recording medium, which can be handled as a subject of commercial transactions.

Note here that the first file is the JCL file 21 which is written in JCL (Job Control Language), and the second file is the script file 24 which is written in a command interpreter language.

The job network creating section 32 has a file readout device 41 which reads outs the first file and adds indexes thereto. Further, the syntax tree creating device 42 creates a syntax tree by scanning the indexed first file 101 from the top.

Through having the above-described structural elements, the job network-to-flow conversion device 10 can divide the JCL file by excluding the parallel execution instructions and the order control instructions, and then convert the divided file into a file structure of a job network form.

Hereinafter, this will be described in more details.

FIG. 1 is a block diagram showing the job network-to-flow conversion device 10 including the file conversion device according to the exemplary embodiment. The job network-to-flow conversion device 10 is a typical computer device, which includes: the CPU (Central Processing Unit) 11 which is a main body for executing computer programs; an HDD (Hard Disk Drive) 12 in which computer programs executed by the CPU 11 and various files (will be described later) processed by the programs are stored; and a RAM (Random Access Memory) 13 in which the program that is read from the HDD 12 by the CPU 11 is temporarily stored.

The CPU 11 executes the job network-to-flow conversion program 30 as a computer program. The job network-to-flow conversion program 30 is a program which causes the CPU 11 to execute processing for reading out the JCL file 21 stored in the HDD 12, converting it to the flowchart 22 and the script file 24 written in a command interpreter language that can be interpreted by a general-purpose OS, and outputting those to the HDD 12.

Figure 2A:
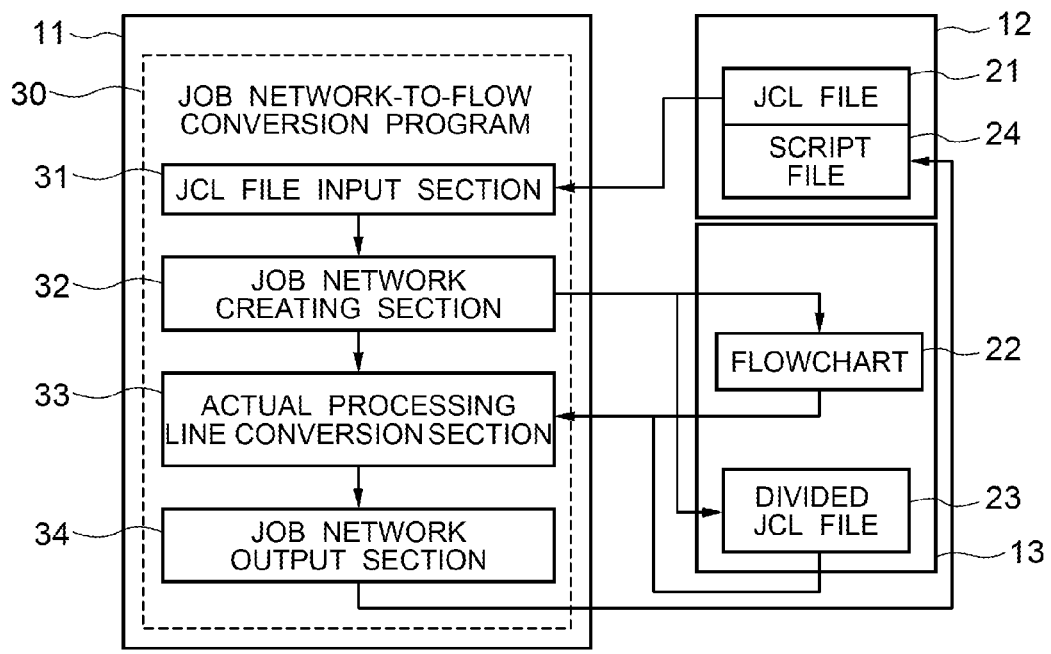
Figure 2B:
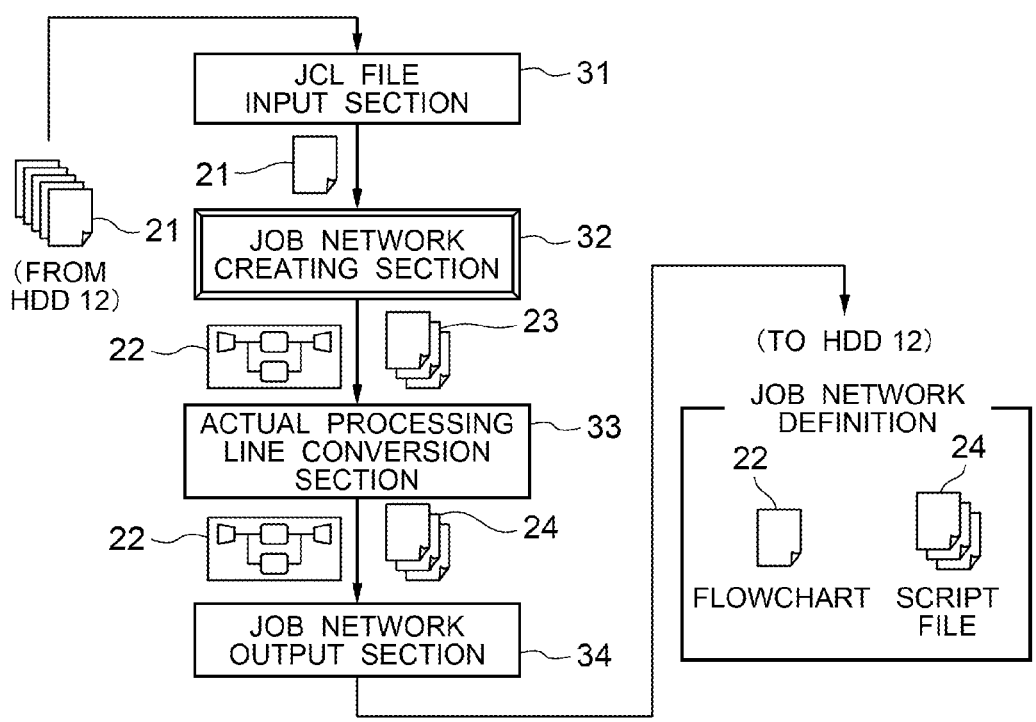

FIG. 2A shows the correspondence with respect to computer resources shown in FIG. 1, and FIG. 2B shows works done by each section and the flows of each file during the works in a more ideational manner.

The file conversion device according to the exemplary embodiment is structured to include the job network creating section 32 and the actual processing line conversion section 33 among the job network-to-flow conversion device 10. In particular, the job network creating section 32 is built as the important structure. The specific structures of the ob network creating section 32 and the actual processing line conversion section 33 included in the file conversion device according to the exemplary embodiment will be described later.

Through having the CPU 11 execute the job network conversion program 30, the JCL file input section 31, the job network creating section 32, the actual processing line conversion section 33, and the job network output section 34 are built on software.

The JCL file input section 31 reads out the JCL file 21 from the HDD 12, and inputs the JCL file 21 to the job network creating section 32. The job network creating section 32 analyzes the JCL description in the JCL file 21 received from the JCL file input section 31, creates the flowchart 22 based on the analysis, and creates the divided JCL file 23 by dividing the JCL file 21 in a unit according to the flowchart 22.

The actual processing line conversion section 33 converts the actual processing description written in the divided file 23 created by the job network creating section 32 into the description contents of the command interpreter language so as to convert the divided file 23 into the script file 24. When the divided file 23 is a JCL file, the actual processing line conversion section 33 converts the actual processing description written in JCL language in the divided JCL file 23 which is created by the job network creating section 32 into the script file 24 written in the command interpreter language.

The job network output section 34 outputs the file structure (the flowchart 22 of a job network flow form and the script file 24) created heretofore to the HDD 12 to have them stored therein. The script file 24 is attached to the flowchart 22, and the flowchart 22 includes each component such as START component, END component, unit job component, parallel divergence component, continue component, job waiting component, and the like.

FIG. 3 is a block diagram which specifically shows the job network creating section 32 shown in FIG. 2, which forms the main part of the file conversion device according to the exemplary embodiment. As shown in FIG. 3, the job network creating section 32 shown in FIG. 2, which forms the main part of the file conversion device according to the exemplary embodiment, includes the file readout device 41, the syntax tree creating device 42, the syntax tree optimizing device 43, and the JCL file dividing device 44.

The JCL file readout device 41, the syntax tree creating device 42, the syntax tree optimizing device 43, and the JCL file dividing device 44 provided to the job network creating section 32 are built on software by having the CPU 11 execute the job network-to-flow conversion program 30.

The file readout device 41 reads the description contents of the inputted file by each line, and manages the description contents by adding an index 101a by each line of the read contents. This will be described in details.

Figure 5:
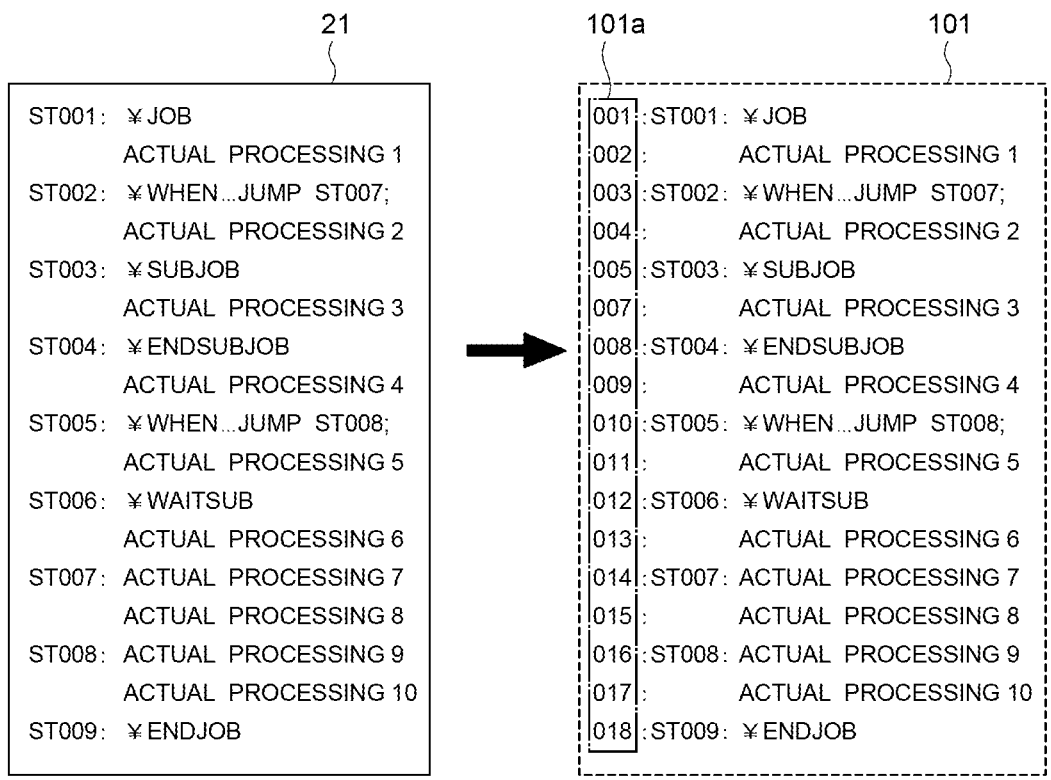
FIG. 5 is an illustration for describing the structure and actions of a JCL file readout device.

As shown in FIG. 5, the description contents of the file 21 are written in the job control language (JCL), and the file readout device 41 executes readout processing of the description contents of the inputted file shown below by a line unit.

The JCL instruction lines include followings.

¥JOB: Means start of JCL description.

¥ENDJOB: Means end of JCL description.

¥SUBJOB: Means start of description of parallel execution processing.

¥ENDSUBJOB: Means end of description of parallel execution processing.

¥WAITSUB: Means wait for end of designated ¥SUBJOB.

¥WHEN_JUMP: Means to jump (JUMP) to designated line under designated condition.

¥WHEN_BACK: Means to back (BACK) to designated line under designated condition.

As shown in FIG. 5, the file readout device 41 reads the description contents of the inputted JCL file 21, adds the index 101a for each line of the read description contents, and manages the description contents as a file 101a with indexes. When managing the description contents to which the indexes 101a are attached, the file readout device 41 manages the contents by storing the JCL file 101 in which the index 101a is added by a line unit of the read description contents into a RAM 13.

In the case of FIG. 5, the file readout device 41 applies "001" that is the index 101a to "ST001: ¥JOB" that is the description content on the first line read from the inputted JCL file 21 by a line unit, applies "002" that is the index 101a to "actual processing 1" that is the description content of the second line, applies "003"-"018" which are the respective indexes 101a for the descriptions contents from "¥WHEN_JUMP" as the description content on the third line to "ST009: ¥ENDJOB" as the description content on the last line, and manages the description contents of the JCL file 21 as the indexed file 101. The JCL file 101 shown in FIG. 5 shows the description contents of the file when the file readout device 41 manages the description contents by applying the indexes 101a to the description contents read out by the file readout device 41 itself by a line unit.

Figure 7:
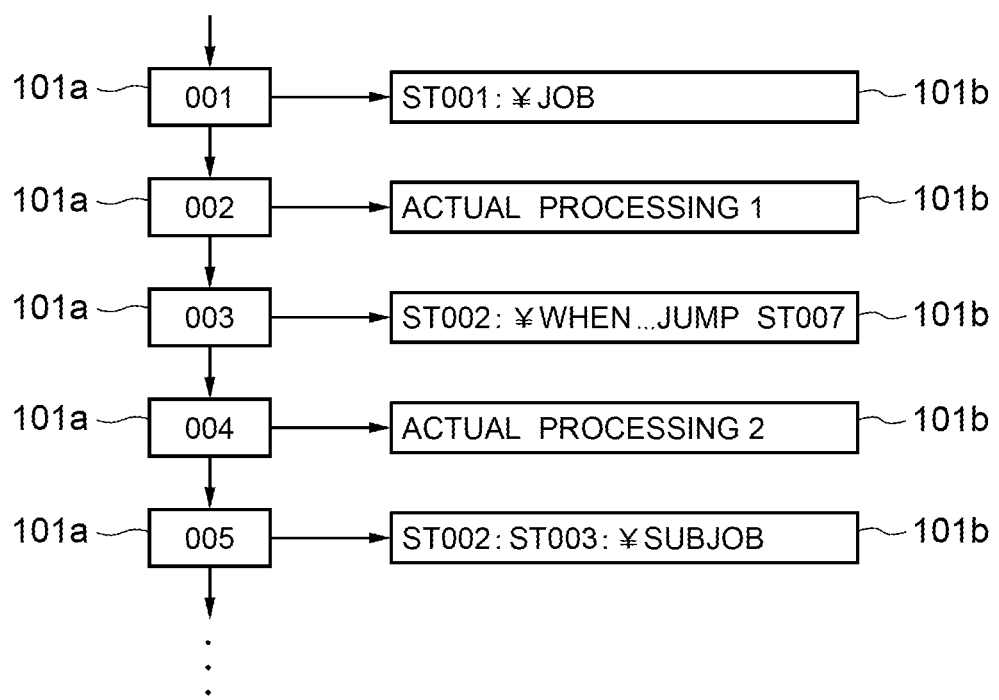
FIG. 7 is an illustration of data structure showing a JCL file with indexes to be recorded to a RAM.

FIG. 7 shows the data structure of the file 101 with the index shown in FIG. 5 which is processed by the file readout device 41 on the RAM 13. As shown in FIG. 7, the file index 101 with the indexes are stored on the RAM 13 in a state where the indexes 101a "001"-"018" are corresponded, respectively, with character string data 101b as the description contents read by a line unit. Further, as shown in FIG. 7, the indexes 101a, "001"-"018", which are the indexes applied, respectively, to the character string data 101b of the description contents are stored on the RAM 13 in a linearly connected manner.

Figure 9:
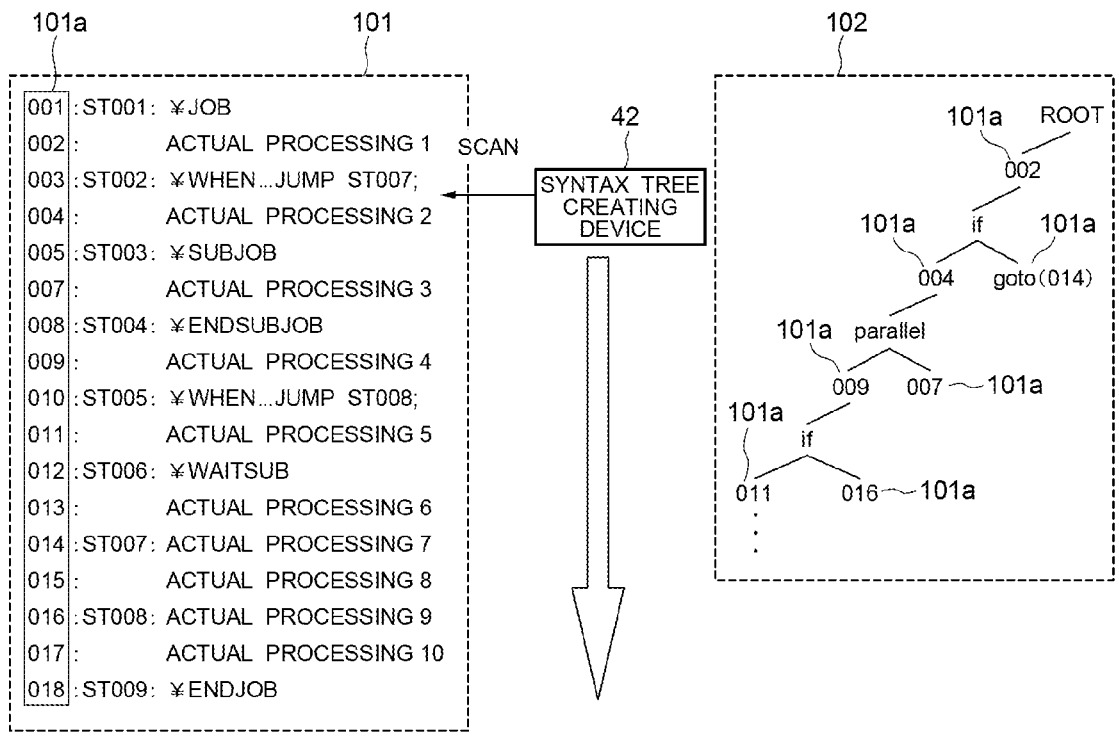
FIG. 9 is an explanatory diagram showing processing executed by a syntax tree creating device shown in FIG. 3 for converting the JCL with index shown in FIG. 5 into the syntax tree.

As shown in FIG. 9, the syntax tree creating device 42 linearly scans the indexes 101a of the file 101 managed by the file readout device 41 to convert the description contents (character string data 101b) in each line of the file to a syntax tree 102 in a tree structure. "To linearly scan the indexes 101a of the file 101 by the syntax tree creating device 42" means to scan the indexes in order from "001" of the index 101a of the file 101 shown in FIG. 7 as the scanning start to "0018" of the last index 101a, for example.

The syntax tree creating device 42 employs a rule to write as "parallel" by corresponding to "¥SUBJOB" since "¥SUB-JOB" means the start of the parallel execution processing, to write as "if" by corresponding to "¥WHEN_JUMP" (or BACK) since "¥WHEN_JUMP" (or BACK) means to jump (or back) to the designated line under a designated condition, and to write "wait" by corresponding to "¥WAITSUB" since "¥WAITSUB" means to wait for the end of "¥SUBJOB" where "¥WAITSUB" is designated so as to convert the description contents of the indexed file 101 into the syntax tree 102.

In the same manner as described above, the syntax tree creating device 42 linearly scans the indexes 101a of the file 101 managed by the file readout device 41 to write the description contents of the JCL instruction lines and the description contents of the order control instructions among the description contents of each line of the file based on the rule, and converts the description contents of the file 101 into the syntax tree 102 of the tree structure by relating those to the aforementioned written expressions.

In the case shown in FIG. 9, the syntax tree creating device 41 writes the description content "ST001: ¥JOB" which is shown with the index 101a of "001" as "ROOT", and writes the description content "actual processing 1" which is shown with the index 101a of "002" as a tree structure for "ROOT" based on the written expression rule. Similarly, the syntax tree creating device 41 linearly scans "003"-"018" which are the indexes 101a of the file 101 to convert the description contents (character string data 101b) to which the indexes 101a are applied into the syntax tree 102 of the tree structure.

In the syntax tree 102 converted by the syntax tree creating device 42 shown in FIG. 9, "ROOT", "if", "parallel", "if", and the like are conversion of the description contents (character string data 101b) shown with indexes 101a of "001", "003", "005", "008", "010", "012", and "018" into the syntax tree 102. Further, the indexes 101a of "002", "004", "007", "009", "011", "013", and "014"-"017" shown in FIG. 9 are conversion of the description contents (character string data 101b) shown with "actual processing 1"-"actual processing 10" of the file 101 into the syntax tree 102.

Figure 10:
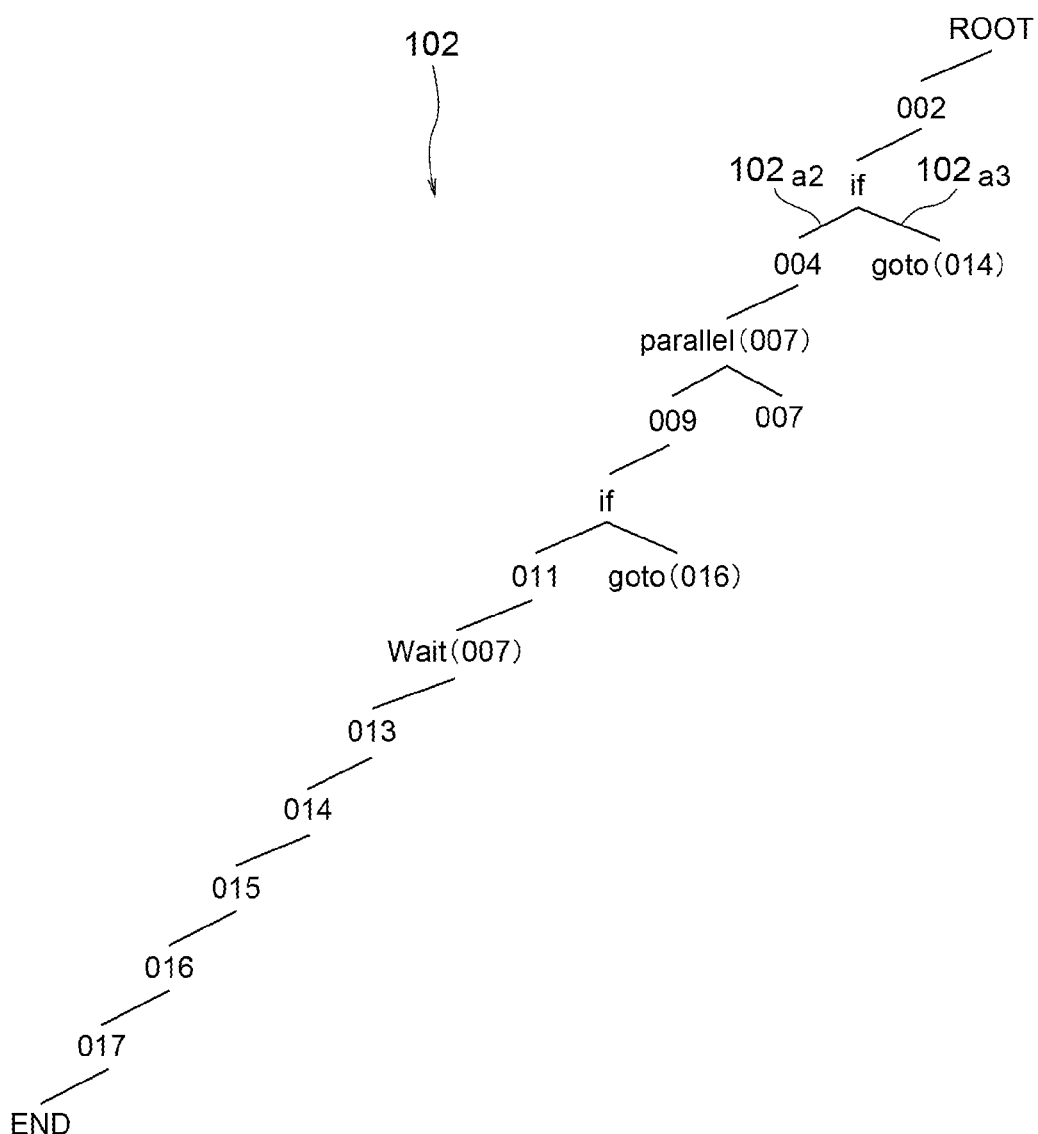
FIG. 10 is an explanatory diagram showing the syntax tree created by the processing executed by the syntax tree creating device shown in FIG. 9.

In the manner described above, the syntax tree creating device 42 converts the description contents (character string data 101b) of each line of the file 101 into the syntax tree 102 of the tree structure by linearly scanning the indexes 101a of the file 101 managed by the file readout device 401 so as to obtain the syntax tree 102 of the tree structure as shown in FIG. 10.

Figure 6:
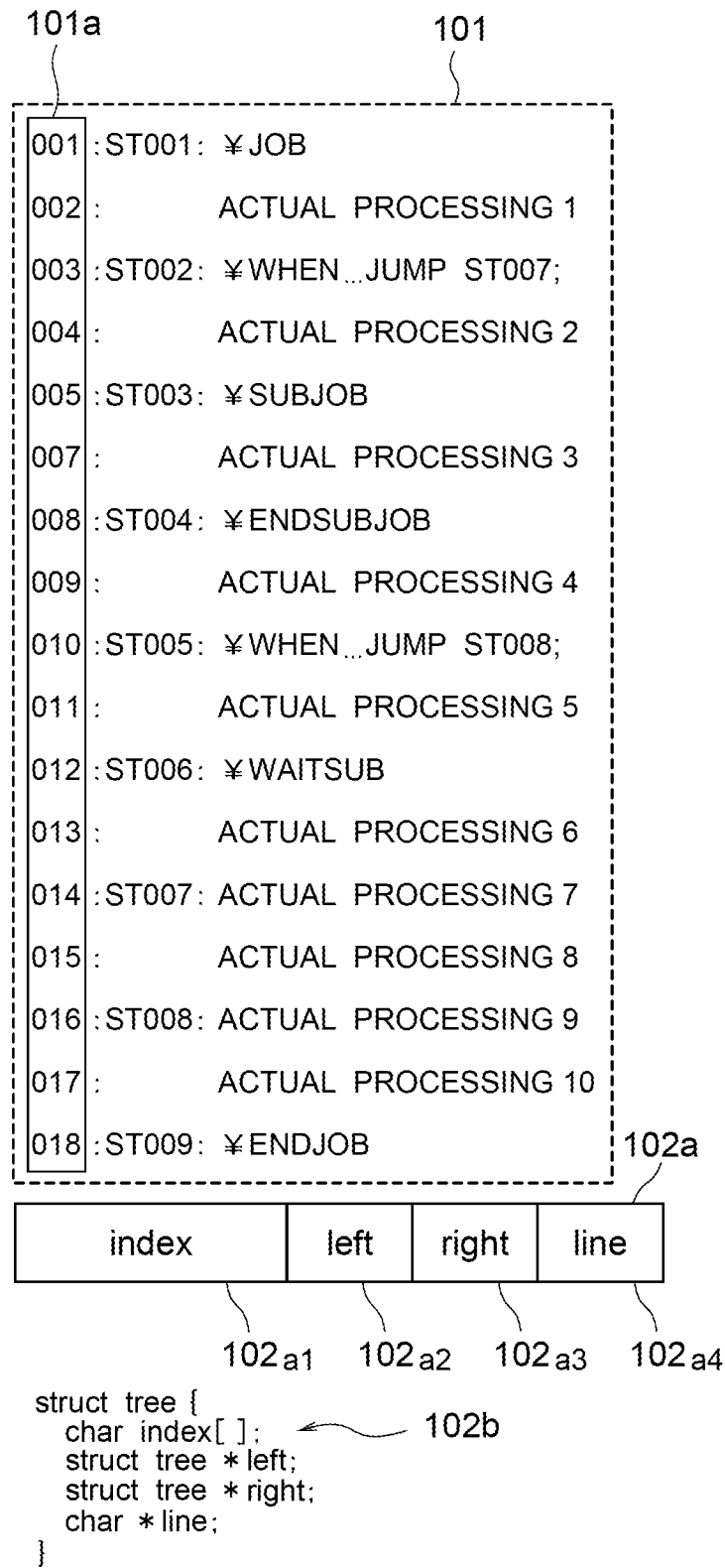
FIG. 6 is an illustration of data structure showing that a syntax tree is in a form of tree.

FIG. 6 shows a relation, on the RAM 13, between the indexed file 101 and the data structure of the syntax tree 102 shown in FIG. 9 processed by the syntax tree creating device 42. As shown in FIG. 9, the syntax tree 102 is built in a form of the tree structure with "ROOT", "if" "parallel", "if" as the indexes which express the instruction lines according to the rule and "002", "007" and the like as the indexes 101a corresponding to the character string data 101b.

The syntax tree 102 created by the syntax tree creating device 42 forms a tree structure in a form of a hierarchical structure as shown in FIG. 10. The tree structure of the syntax tree 102 shown in FIG. 10 will be described. As shown in FIG. 10, having the index of "ROOT" as the highest layer, the following index "002" is located at a next hierarchical layer as a left child element (left) 102a2, the index "if" is connected to the index "002" at a next hierarchical layer as the left child element (left) 102a2, the index "004" is connected to the index "if" as a left child element (left) 102a2 while the index "014" is connected to the index "if" as a right child element (right) 102a3 at a next hierarchical layer, respectively, the index "parallel" is connected to the index "004" at a next hierarchical layer as a left child element (left) 102a2, and the index "009" is connected to the index "parallel" as a left child element (left) 102a2 while the index "007" is connected to the index "parallel" as a right child element (right) 102a3 at a next hierarchical layer, respectively. The following indexes "if"-"END" are connected as the left child elements (left) or the right child element (right) in order as the hierarchical structure.

In the manner as described above, the syntax tree 102 shown in FIG. 10 is built as the tree structure employing the form of the hierarchical structure by having the indexes "ROOT"-"END" as the left child elements (left) 102a2 or the right child elements (right) 102a3.

Figure 8:
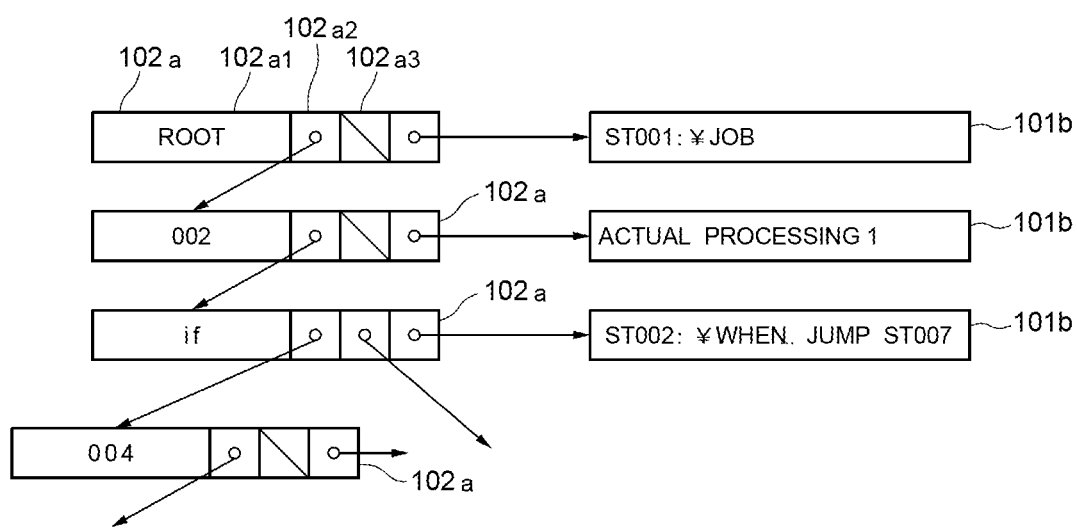
FIG. 8 is an illustration of data structure showing that the syntax tree is in a form of tree.

When the syntax tree creating device 42 records the syntax tree 102 of the tree structure on the RAM 13, it is recorded as a plurality of data strings 102a configuring the syntax tree 102 as shown in FIG. 8.

That is, as shown in FIG. 6, among the data structure of the file 101 to which the indexes 101a are applied, the data string 102a of each layer of the syntax tree 102 is built as the data structure in which the index 102a1 is located at the top, then the left child element (left) or the right child element (right)

102*a*3 is arranged, and further the line number (line) 102*a*4 of the character data string 101*b* to which the index 101*a* is applied is arranged. These data strings 102*a* can be expressed with a language as shown with a reference numeral 102*b* in the drawing. The index 101*a*1 includes the index 101*a* shown in FIG. 6 and the indexes such as "ROOT", "if", "parallel", "wait", "goto", "END", and the like shown in FIG. 10.

As shown in FIG. 8, the syntax tree creating device 42 records the data strings 102*a* of each layer shown in FIG. 6 on the RAM 13 by keeping the relation of the tree structure shown in FIG. 10 from the data string 102*a* of the hierarchical layer of "ROOT" that is the index 101*a*1 to the data string 102*a* of the hierarchical layer of "END" that is the index 101*a*1. Further, as shown in FIG. 8, the syntax tree creating device 42 records, on the RAM 13, the (lines) 102*a*4 of the data strings 102*a* by having them corresponded, respectively, to the character string data 101*b* as the description contents of each line.

The syntax tree optimizing device 43 sets following optimization rules based on the order rule of JCL and the flow characteristics of the target job management tool.

Rule 1: Optimization is conducted in order from leaves to "ROOT".

Rule 2: "goto (nnn)" and node "nnn" on branches belonging to the node "if" of the same parent can be connected, only when the target nodes are not locked. Note that "(nnn)" and "nnn" mean the indexes 101*a* of "002", "004", "007", "009", "011", "013", and "014"-"018". This applies hereinafter.

Rule 3: "wait (nnn)" and node "nnn" on branches belonging to the node "parallel" of the same parent can be connected, only when the target nodes are not locked.

Rule 4: Node "END" can be complemented to the leaves of the branches belonging to the node "parallel".

Rule 5: "goto (nnn)" can be converted to the branches of the nodes "nnn"-"END".

The syntax tree optimizing device 43 optimizes the syntax tree 102 of the tree structure inputted from the syntax tree creating device 42 as the flowchart based on the optimization rules described above. The process of optimizing the syntax tree 102 by the syntax tree optimizing device 43 based on the optimization rules will be described by referring to the case of the syntax tree 102 shown in FIG. 10 based on FIG. 13-FIG. 18. In FIG. 13-FIG. 18, "node * * *" corresponds to the indexes 101*a*1 of "001"-"018" included in the syntax tree 102 shown in FIG. 10. Further, in FIG. 13-FIG. 18, "ROOT", "if", "goto", "parallel", "wait", and "END" correspond to the indexes 101*a*1 of "ROOT", "if", "goto", "parallel", "wait", and "END" included in the syntax tree 102 shown in FIG. 10.

Figure 13:
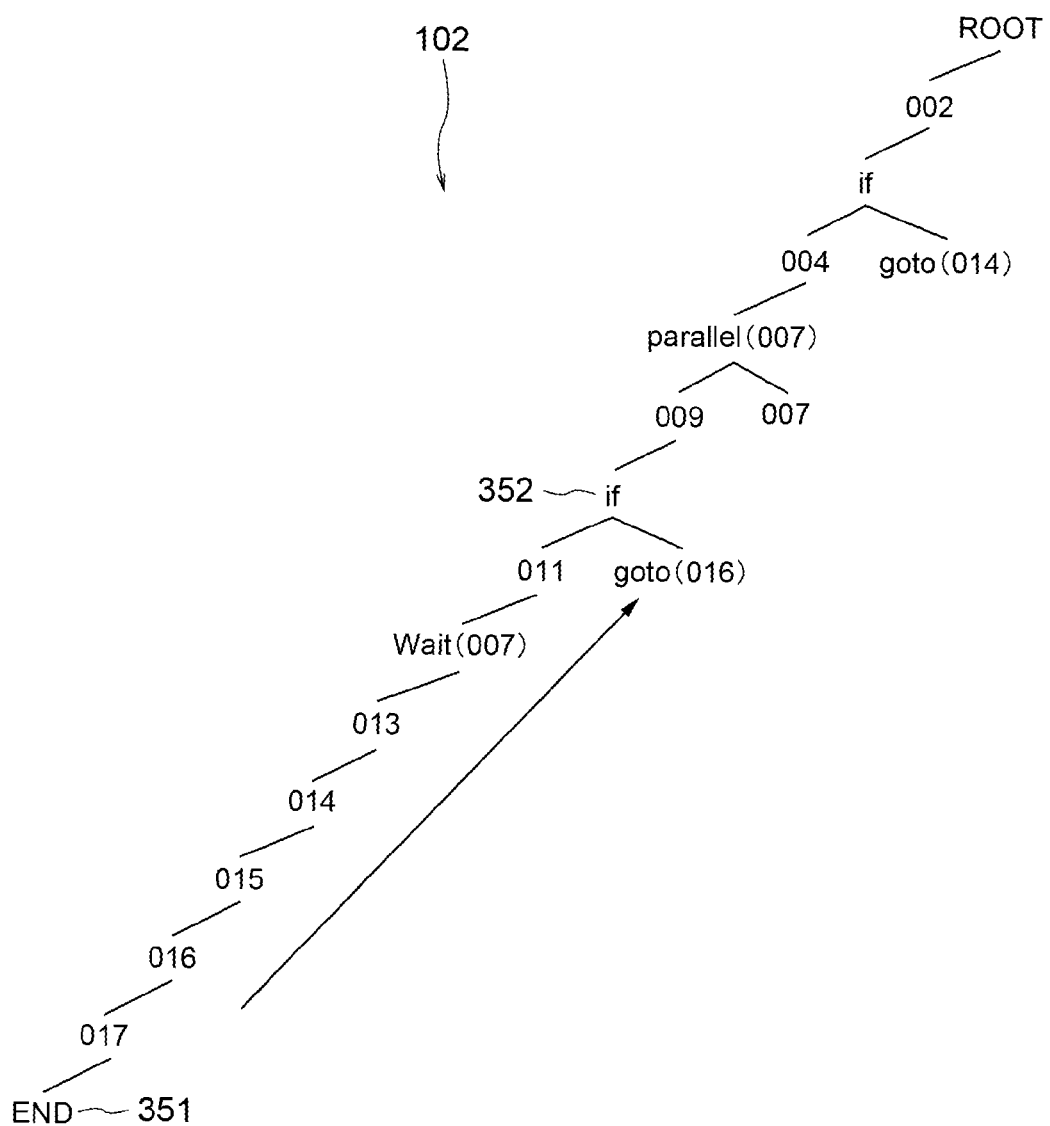
FIG. 13 is an explanatory diagram showing an example of processing executed on the syntax tree shown in FIG. 9 by the syntax tree optimizing device shown in FIG. 3, which shows a state where the syntax tree optimizing device moves a pointer to "if" node.

The syntax tree optimizing device 43 searches "END" within the tree structure of the syntax tree 102 shown in FIG. 10. Then, as shown in FIG. 13, the syntax tree optimizing device 43 starts the search of the tree structure of the syntax tree 102 shown in FIG. 10 in the direction towards "ROOT" by having the searched "END" as the start point of the optimization "END node 351". As shown in FIG. 13, the syntax tree optimizing device 43 first detects "if node 352" as shown in FIG. 13.

Figure 14:
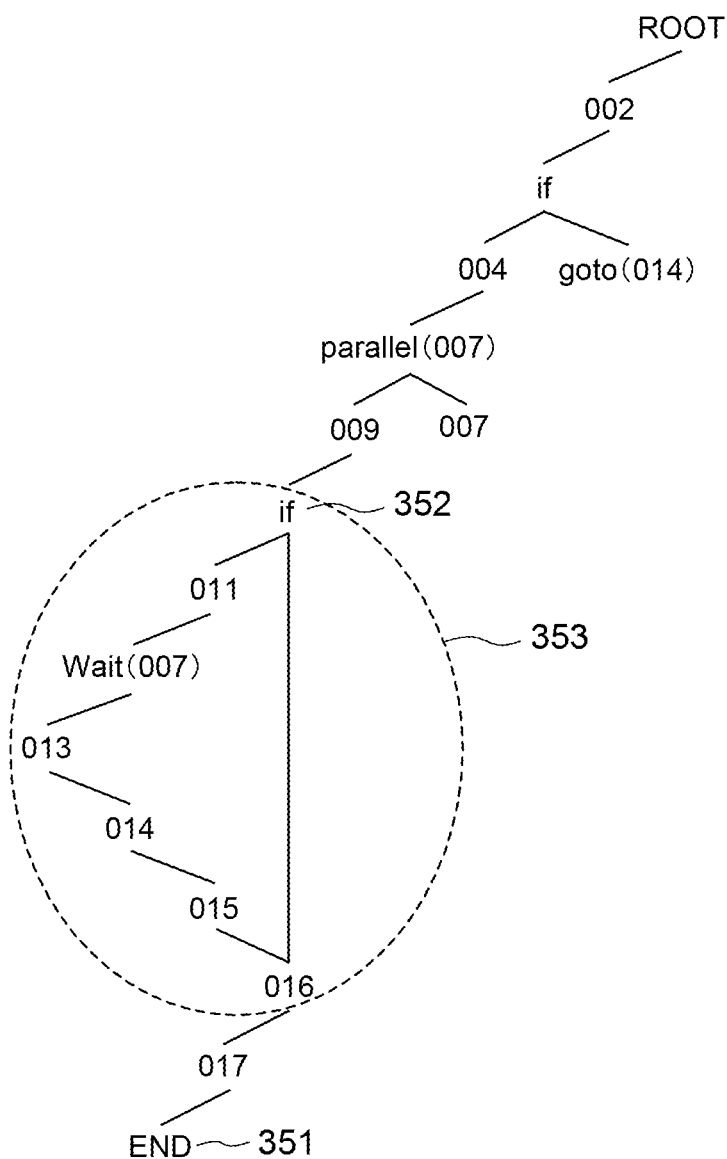
FIG. 14 is an explanatory diagram showing an example of processing executed on the syntax tree shown in FIG. 9 by the syntax tree optimizing device shown in FIG. 3, which shows a state where the syntax tree optimizing device connects "goto (016)" with node "016" and all nodes between the "if" node and the node "016" are locked.

As shown in FIG. 14, the syntax tree optimizing device 43 recognizes that the rule 2 is applicable by referring to the rules when detecting "if 352", and executes connecting processing of "goto (016)" with the node "016". Further, as shown in FIG. 14, the syntax tree optimizing device 43 locks the nodes "015"-"011" on all the paths between "goto (016)" and the node "016". In FIG. 14, the nodes "016"-"011" locked by the syntax tree optimizing device 43 are shown with reference numeral 353.

Figure 15:
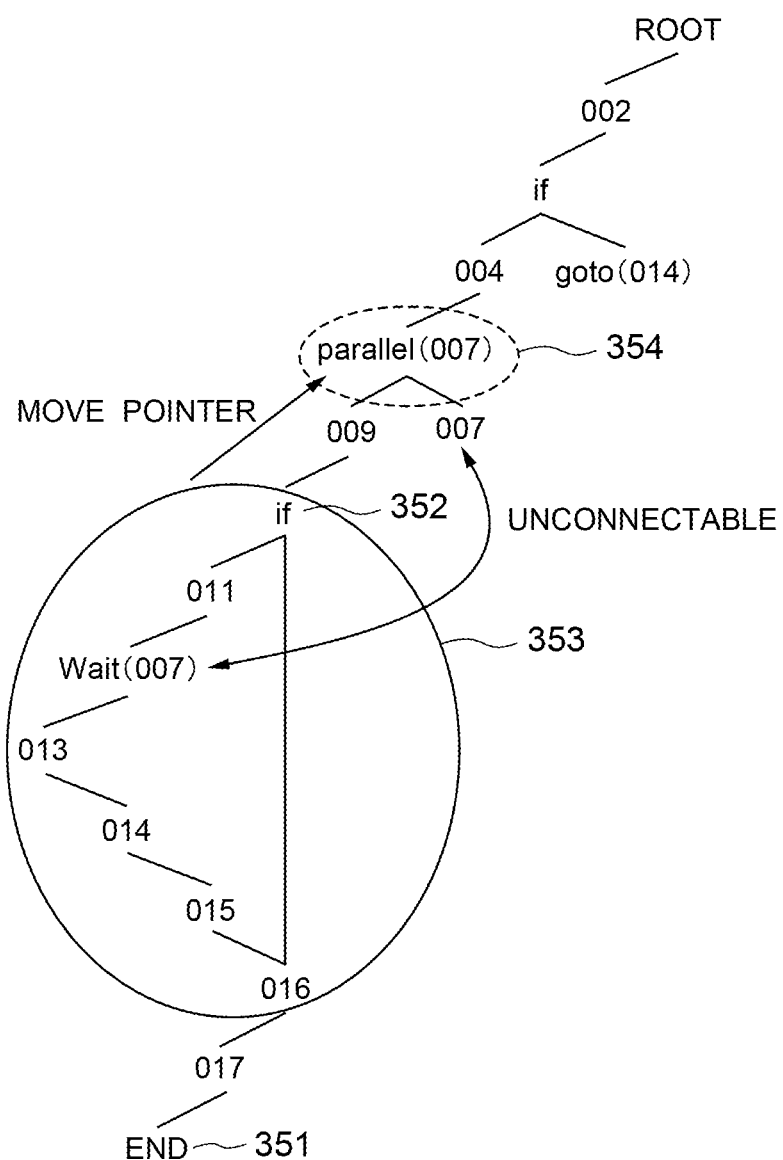
FIG. 15 is an explanatory diagram showing an example of processing executed on the syntax tree shown in FIG. 9 by the syntax tree optimizing device shown in FIG. 3, which shows a state where the syntax tree optimizing device moves the pointer to "parallel" node.

As shown in FIG. 15, when completing the processing shown in FIG. 14, the syntax tree optimizing device 43 starts a search and detects "parallel" from the syntax tree 102 shown in FIG. 10. FIG. 15 shows the state where the syntax tree optimizing device 43 detects "parallel (007) 354".

As shown in FIG. 15, the syntax tree optimizing device 43 recognizes that the rule 3 is applicable by referring to the rules when detecting "parallel (007) 354", and executes connecting processing of the node "007" with the node "wait (007)". In this case, the node "wait (007)" is in the lock state 353 as shown in FIG. 14, so that the syntax optimizing device 43 stops the connecting processing of the node "007" with the node "wait (007)".

Figure 16:
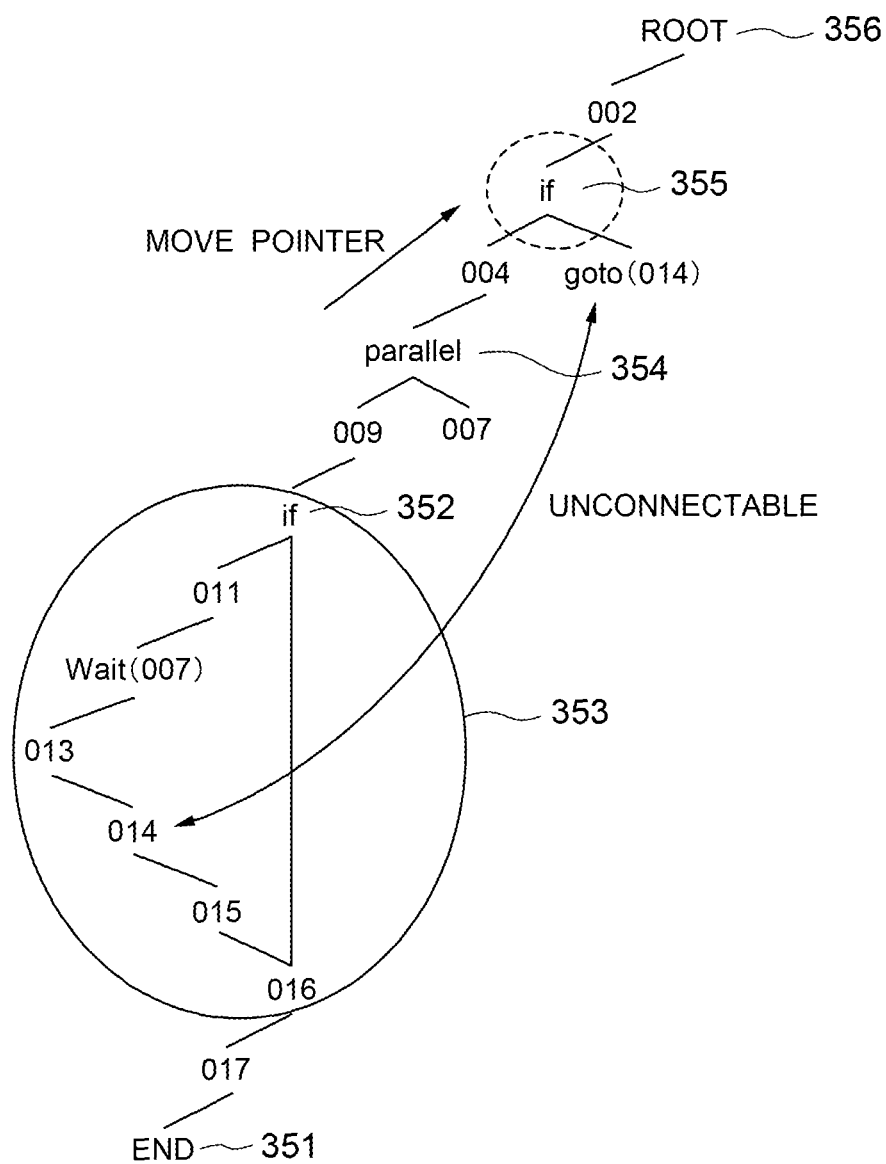
FIG. 16 is an explanatory diagram showing an example of processing executed on the syntax tree shown in FIG. 9 by the syntax tree optimizing device shown in FIG. 3, which shows a state where the syntax tree optimizing device moves the pointer to the "if" node.

As shown in FIG. 16, the syntax tree optimizing device 43 re-starts a search after stopping the connecting processing in FIG. 15, and detects next "if". As shown in FIG. 16, the syntax tree optimizing device 43 recognizes that the rule 2 is applicable by referring to the rules when detecting "if 355", and executes connecting processing of the node "014" with "goto (014)". In this case, the node "014" is in the lock state 353 as shown in FIG. 14, so that the syntax optimizing device 43 stops the connecting processing of the node "014" with "goto (014)".

Figure 17:
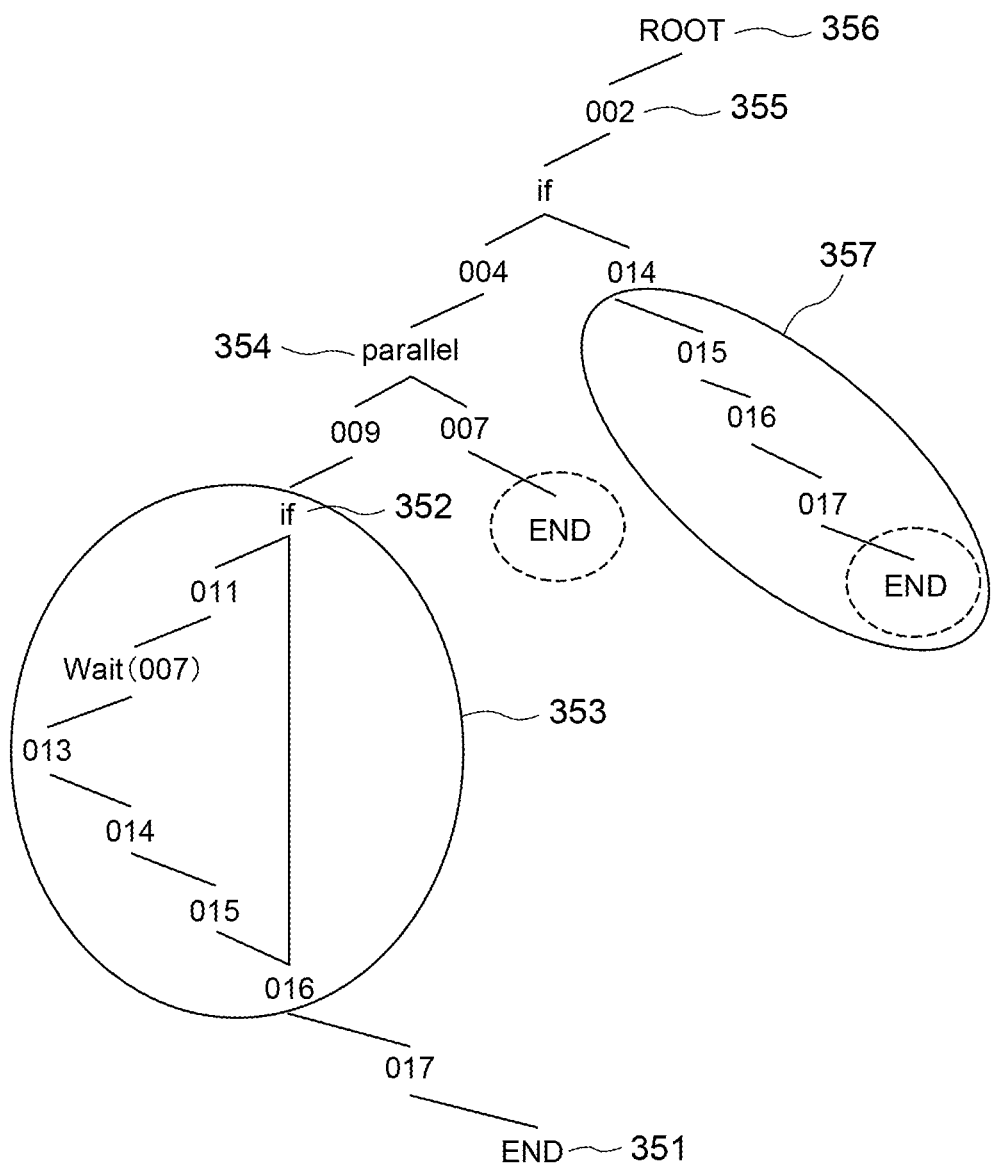
FIG. 17 is an explanatory diagram showing an example of processing executed on the syntax tree shown in FIG. 9 by the syntax tree optimizing device shown in FIG. 3, which shows a state where the syntax tree optimizing device converts "goto (014)" to a form which executes processing of nodes "014"~"END"

As shown in FIG. 17, after stopping the connecting processing in FIG. 16, the syntax tree optimizing device 43 recognizes that the rule 4 is applicable by referring to the rules, and complements "END" to the node "007" that is a child leaf of "parallel 354". Further, as shown in FIG. 17, the syntax tree optimizing device 43 recognizes that the rule 5 is applicable by referring to the rules, and converts "goto (014)" to a hierarchical structure 357 of the nodes "014"-"END 351".

Figure 18:
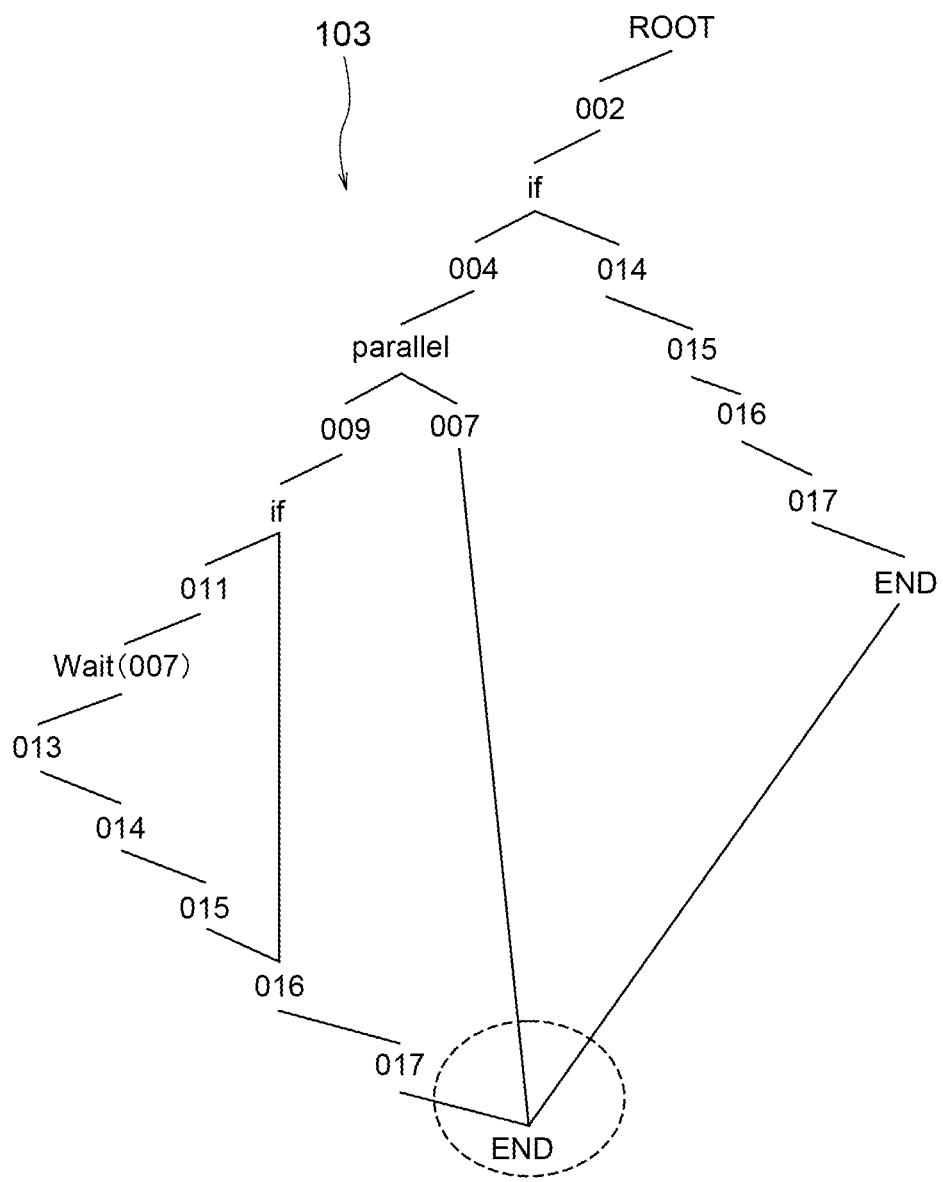
FIG. 18 is an explanatory diagram showing an example of processing executed on the syntax tree shown in FIG. 9 by the syntax tree optimizing device shown in FIG. 3, which shows a state where the syntax tree optimizing device 43 connects all leaves "END"
Figure 19:
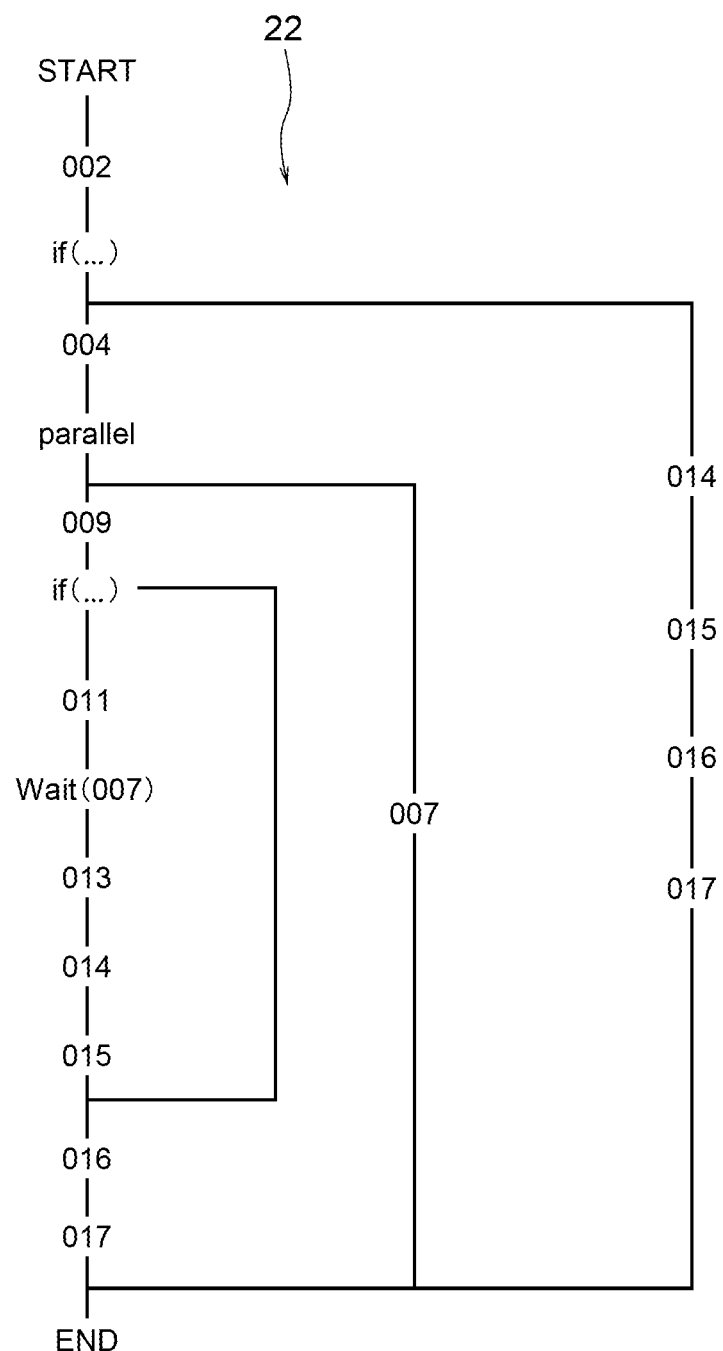
FIG. 19 is an explanatory diagram showing a flowchart which is outputted by the syntax tree optimizing device from the optimized syntax tree.

As shown in FIG. 18, when completing the processing in FIG. 17, the syntax tree optimizing device 43 executes the processing for connecting "END" of the leaf complemented in FIG. 17 to "END 351" as the start point of the search to optimize the syntax tree 102 shown in FIG. 10 to the flowchart 22 shown in FIG. 19. Thereby, the optimization processing is ended.

As shown in FIG. 19, the syntax tree 102 shown in FIG. 10 is in a flow of the target job management tool and it is the flowchart that is simplified to the maximum. As evident from FIG. 19, the flowchart includes "START", "if", "parallel", and "wait" as the controllers. Further, the flowchart 22 shown in FIG. 19 is built as a flowchart of a network form in which "START" (ROOT) as the start point and "END" as the end point are fixed. Furthermore, in FIG. 19, "002"-"017" correspond to "002"-"017" included in the syntax tree 102 shown in FIG. 10. Moreover, in FIG. 19, "ROOT", "if", "goto", "parallel", "wait", and "END" correspond to "ROOT", "if", "goto", "parallel", "wait", and "END" included in the syntax tree 102 shown in FIG. 10.

Figure 20:
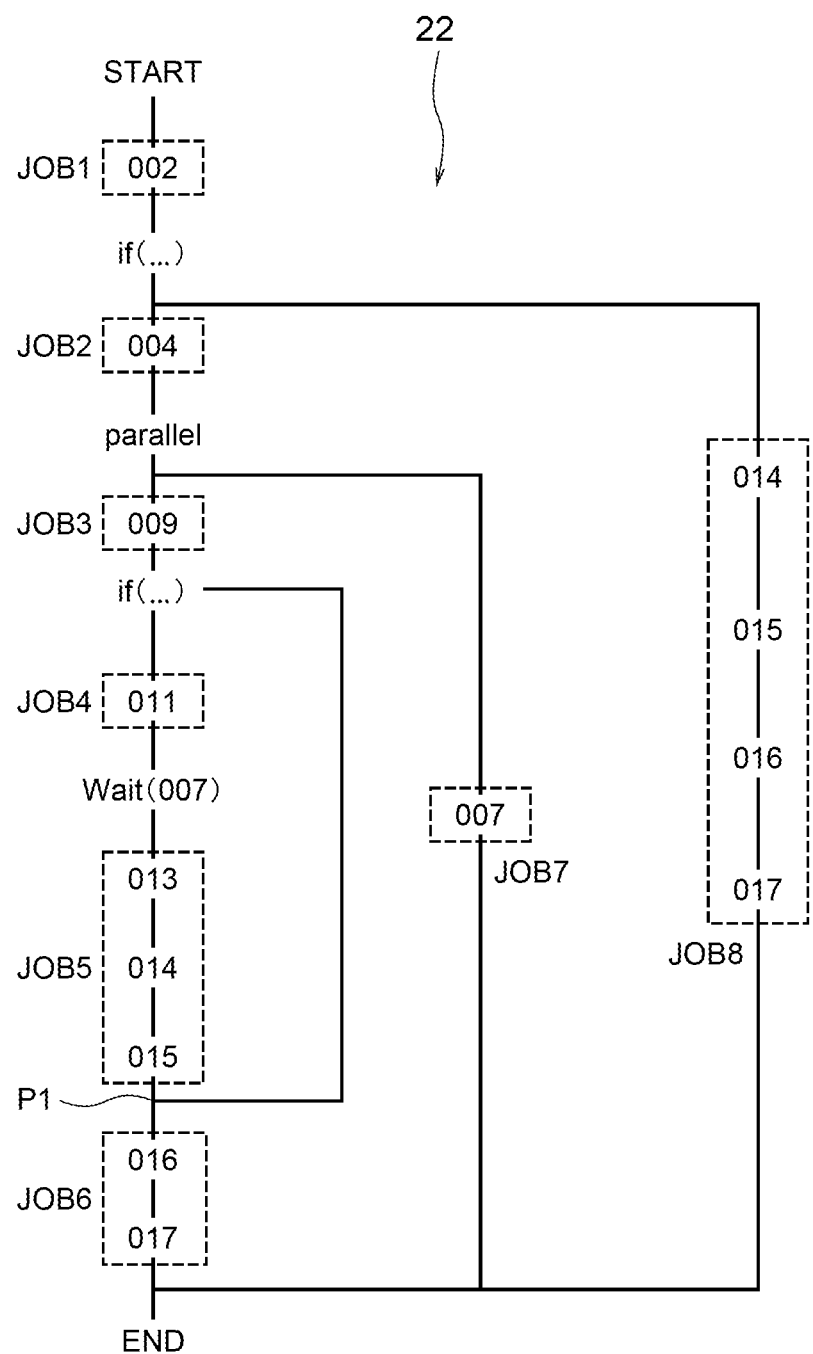
FIG. 20 is an explanatory diagram showing a state where the flowchart shown in FIG. 19 is divided with controllers.

As shown in FIG. 20, upon receiving the flowchart 22 shown in FIG. 19 from the syntax tree optimizing device 43, the file dividing device 44 executes dividing processing of the inputted JCL file 101 by having the controllers (START/if/parallel/wait) of the flowchart 22 as the identifiers, and outputs a file 23 to which the dividing processing has been done and a flowchart 22*a* in which the divided file 23 is taken into consideration. This will be described in details by referring to FIG. 20.

As shown in FIG. 20, upon detecting the controller "START" and the controller "if" of the flowchart 22, the file dividing device 44 recognizes the index "002" existing between those controllers. Under that recognition, the file dividing device 44 takes the description content "actual processing 1" of the line of the JCL file 101 to which the index 101a of "002" is applied as a single file, and divides it from the JCL file 101 as an individual file. This divided file becomes the divided file 23 of JOB1 including the character string data 101b of the line to which "002" as the index 101a is applied.

As shown in FIG. 20, upon detecting the controller "if" and the controller "parallel" of the flowchart 22, the file dividing device 44 recognizes the index "004" existing between those controllers. Under that recognition, the file dividing device 44 takes the description content "actual processing 2" of the line of the JCL file 101 to which the index 101a of "004" is applied as a single file, and divides it from the JCL file 101 as an individual file. This divided file becomes the divided file 23 of JOB2 including the character string data 101b of the line to which "004" as the index 101a is applied.

As shown in FIG. 20, upon detecting the controller "parallel" and the controller "if" of the flowchart 22, the file dividing device 44 recognizes the index "009" existing between those controllers. Under that recognition, the file dividing device 44 takes the description content "actual processing 4" of the line of the JCL file 101 to which the index 101a of "009" is applied as a single file, and divides it from the JCL file 101 as an individual file. This divided file becomes the divided file 23 of JOB3 including the character string data 101b of the line to which "009" as the index 101a is applied.

As shown in FIG. 20, upon detecting the controller "if" and the controller "wait (007)" of the flowchart 22, the file dividing device 44 recognizes the index "011" existing between those controllers. Under that recognition, the file dividing device 44 takes the description content "actual processing 5" of the line of the JCL file 101 to which the index 101a of "011" is applied as a single file, and divides it from the JCL file 101 as an individual file. This divided file becomes the divided file 23 of JOB4 including the character string data 101b of the line to which "011" as the index 101a is applied.

As shown in FIG. 20, upon detecting the controller "wait (007)" and the controller "divergence point P1 of the network having if as start point" of the flowchart 22, the file dividing device 44 recognizes the indexes "013, 014, 015" existing between those controllers. Under that recognition, the file dividing device 44 takes the description content "actual processing 6, 7, 8" of the lines of the JCL file 101 to which the indexes 101a of "013, 014, 015" are applied as a single file, and divides it from the JCL file 101 as an individual file. This divided file becomes the divided file 23 of JOB5 including the character string data 101b of the lines to which "013, 014, 015" as the indexes 101a of the JCL file 101 are applied.

As shown in FIG. 20, upon detecting the controller "divergence point P1 of the network having if as start point" and the controller "END" of the flowchart 22, the file dividing device 44 recognizes the indexes "016, 017" existing between those controllers. Under that recognition, the file dividing device 44 takes the description content "actual processing 9, 10" of the lines of the JCL file 101 to which the indexes 101a of "016, 017" are applied as a single file, and divides it from the JCL file 101 as an individual file. This divided file becomes the divided file 23 of JOB6 including the character string data 101b of the line to which "016, 017" as the indexes 101a of the JCL file 101 are applied.

As shown in FIG. 20, the file dividing device 44 detects the controller "parallel" by having the controller "END" of the flowchart 22 as the start point, and then detects a network that is in parallel to the network configured with the indexes 101a of "009, 011, 007, 013, 014, 015, 016, 017". Upon detecting the network, the file dividing device 44 recognizes the index "007" existing between the controller "parallel" and the controller "END". Under that recognition, the file dividing device 44 takes the description content "actual processing 3" of the line the JCL file 101 to which the index 101a of "007" is applied as a single file, and divides it from the JCL file 101 as an individual file. This divided file becomes the divided file 23 of JOB7 including the character string data 101b of the line of the JCL file 101 to which "007" as the index 101a of the JCL file 101 is applied.

As shown in FIG. 20, the file dividing device 44 detects the controller "if" that is on the closer side of the controller "START" than the controller "parallel" by having the controller "END" of the flowchart 22 as the start point, and then detects a network that is in parallel to the network configured with the indexes 101a of "004, 009, 011, 007, 013, 014, 015, 016, 017". Upon detecting the network, the file dividing device 44 recognizes the indexes "014, 015, 016, 017" existing between the controller "if" and the controller "END". Under that recognition, the file dividing device 44 takes the description content "actual processing 7, 8, 9, 10" of the lines of the JCL file 101 to which the indexes 101a of "014, 015, 016, 017" are applied as a single file, and divides it from the JCL file 101 as an individual file. This divided file becomes the divided file 23 of JOB8 including the character string data 101b of the lines of the JCL file 101 to which "014, 015, 016, 017" as the indexes 101a of the JCL file 101 are applied.

Figure 21:
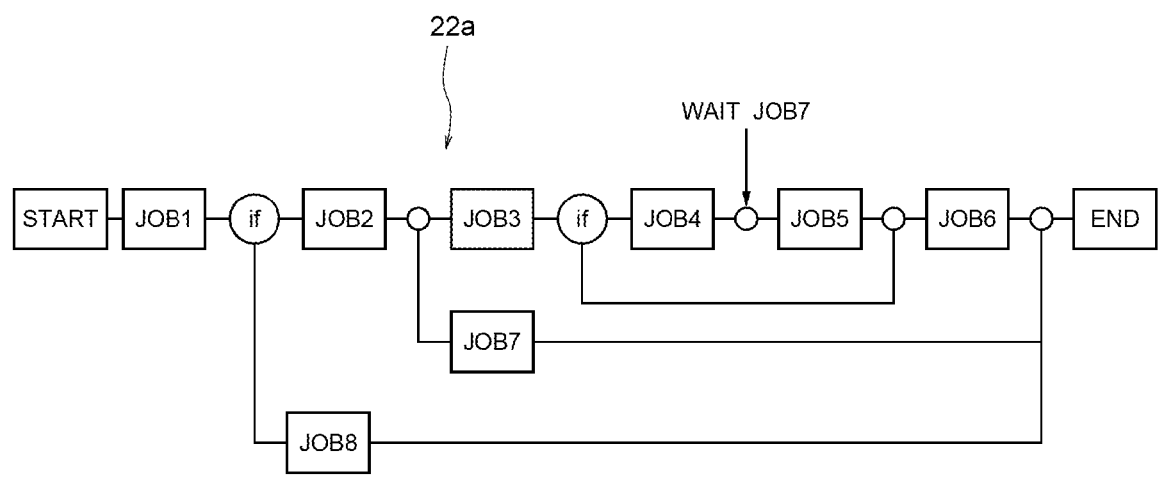
FIG. 21 is an explanatory diagram showing an optimized flowchart of jobs in a unit of divided JCL file, which is created by the JCL file dividing device through converting the flowchart.
Figure 22A:
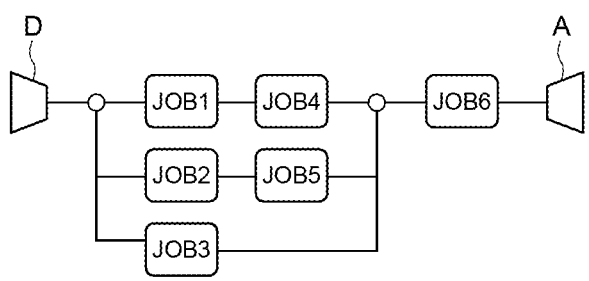
FIG. 22 is an explanatory diagram showing an example of a job network.
Figure 22B:
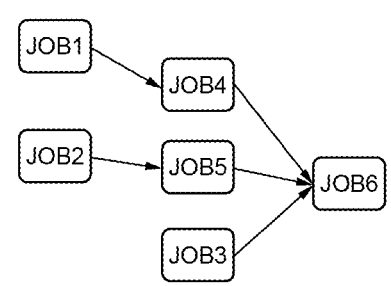
Figure 22C:
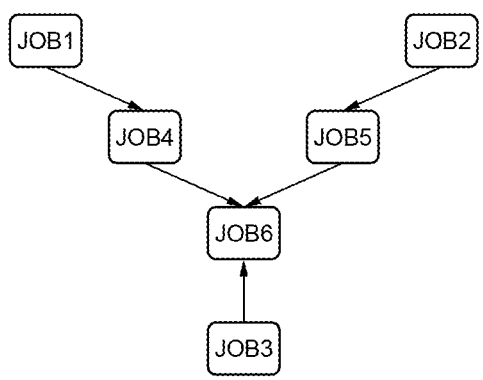
Figure 22D:
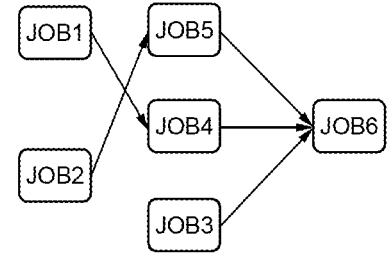
Figure 23:
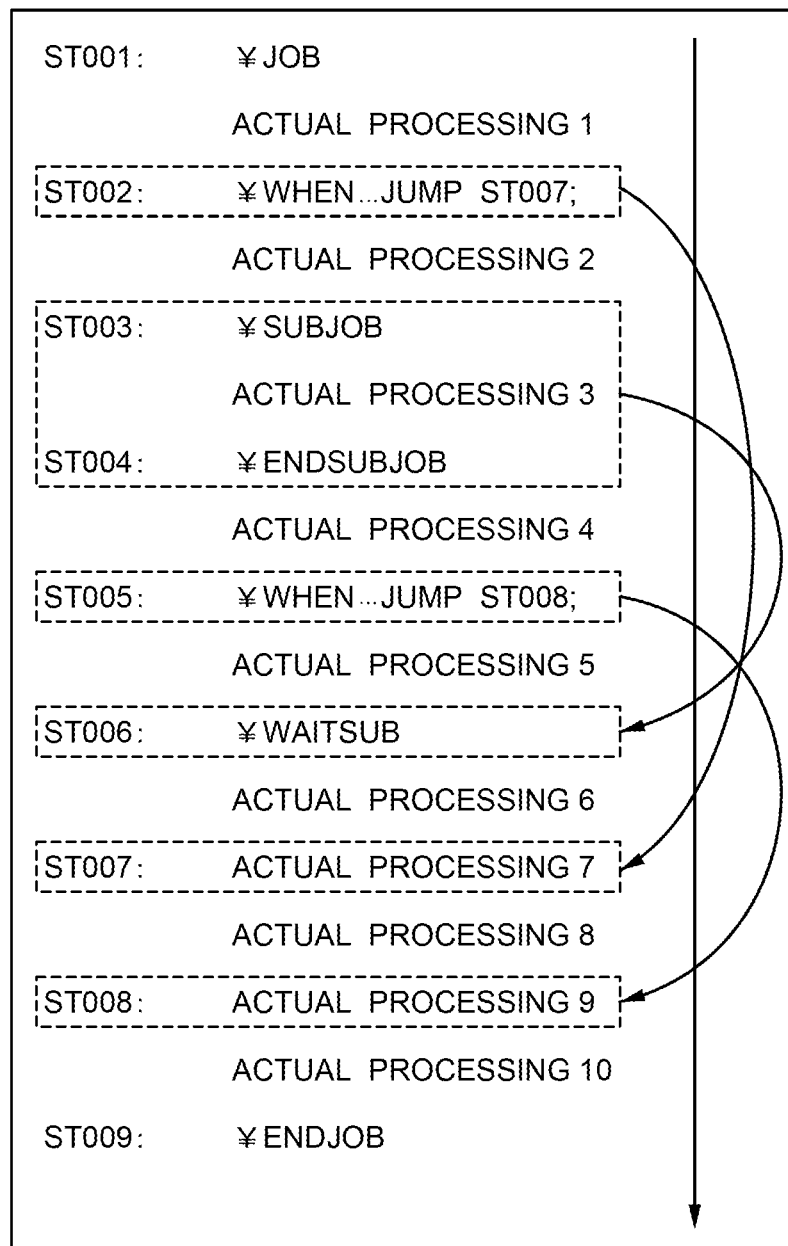
FIG. 23 is an explanatory diagram showing an example of the JCL file in which parallel execution instructions and order control instructions are used frequently.

As described above, as shown in FIG. 20 and FIG. 21, upon receiving the flowchart 22 shown in FIG. 19 from the syntax tree optimizing device 43, the file dividing device 44 performs dividing processing of the inputted JCL file 101 by having the controllers (START/if/parallel/wait) of the flowchart 22 as the identifiers, and outputs not only a plurality of divided files 23 to which the dividing processing has been done but also the flowchart 22a in which the divided files 23 are taken into consideration. As shown in FIG. 21, the flowchart 22a which takes the divided files 23 into consideration means the flowchart 22a in which the indexes 101a1 such as "if", and "wait JOB7", are written in the network and "JOB1"-"JOB8" as the divided JOB files are written in the network as shown in FIG. 19. "JOB1"-"JOB8" correspond to the divided files 23 described above.

Figure 4:
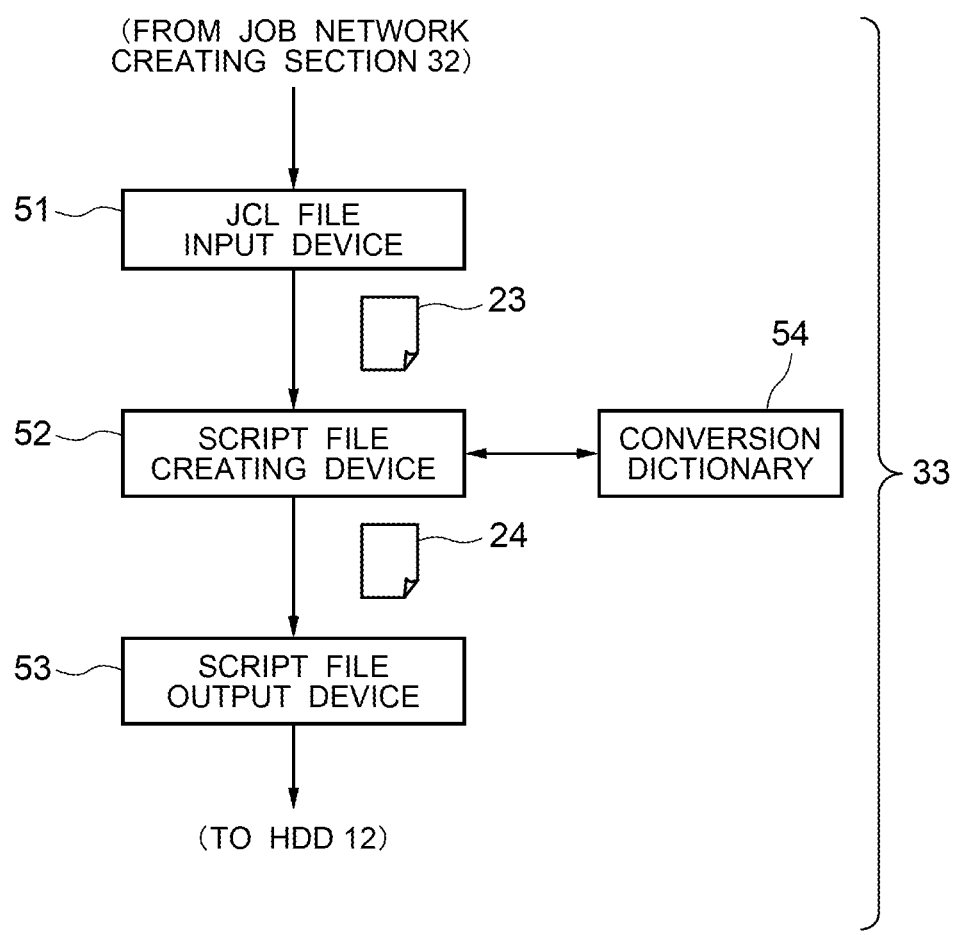
FIG. 4 is an explanatory diagram showing processing contents of the actual processing line conversion section shown in FIG. 2 in more details.

FIG. 4 is a block diagram which shows a specific structure of the actual processing line conversion section 33 which complements the job network creating section 32 shown in FIG. 2 which configures the main part of the file conversion device according to the embodiment. The actual processing line conversion section 33 according to the exemplary embodiment converts the divided files outputted by the file dividing device 44 of the job network creating section 32 to the script file. Specifically, the actual processing line conversion section 33 includes a JCL file input device 51, a script file creating device 52, and a script file output device 53.

The JCL file input device 51 receives the files 23 divided by the file dividing device 44, and outputs those to the script file creating device 52.

The script file creating device 52 converts the JCL file 23 into the script file 24 by using a conversion dictionary 54. In the conversion dictionary 54, the job control language (JCL) and a command interpreter language that can be interpreted by a general-purpose operation system are stored in a corresponding manner in order to convert the actual processing description written in the JCL file 23 into the script file that can be interpreted by the widely-used operation system. Therefore, the script file creating section 52 converts the actual processing descriptions written in the files 23 into the command interpreter language by using the conversion dictionary 54 so as to convert the divided files 23 into the script files 24.

The script file output device 53 stores the script files 24 received from the script file creating device 52 in the HDD 12.

Next, described is a method for converting a file form written in a given language into a file form that can be interpreted by another language by using the job network-to-flow conversion device 10 including the file conversion device according to the exemplary embodiment.

First, the JCL file input section 31 reads the JCL file 21 from the HDD 12, and outputs the JCL file 21 to the file readout device 41 of the job network creating section 32. As shown in FIG. 5, the file readout device 41 reads the description contents of the inputted JCL file 21 by each line, and manages the description contents as the file 101a with indexes by applying the index 101a to each line of the read description contents. In the case of FIG. 5, the file readout device 41 applies "001" that is the index 101a to "ST001: ¥JOB" that is the description content of the first line read from the inputted JCL file 21 by a line unit, applies "002" that is the index 101a to "actual processing 1" that is the description content of the second line, applies "003"–"018" which are the indexes 101a, respectively, to the description contents from the third line to the last line from "¥WHEN_JUMP" to "ST009: ¥ENDJOB", and manages the description contents of the JCL file 21 as the indexed file 101.

Figure 11:
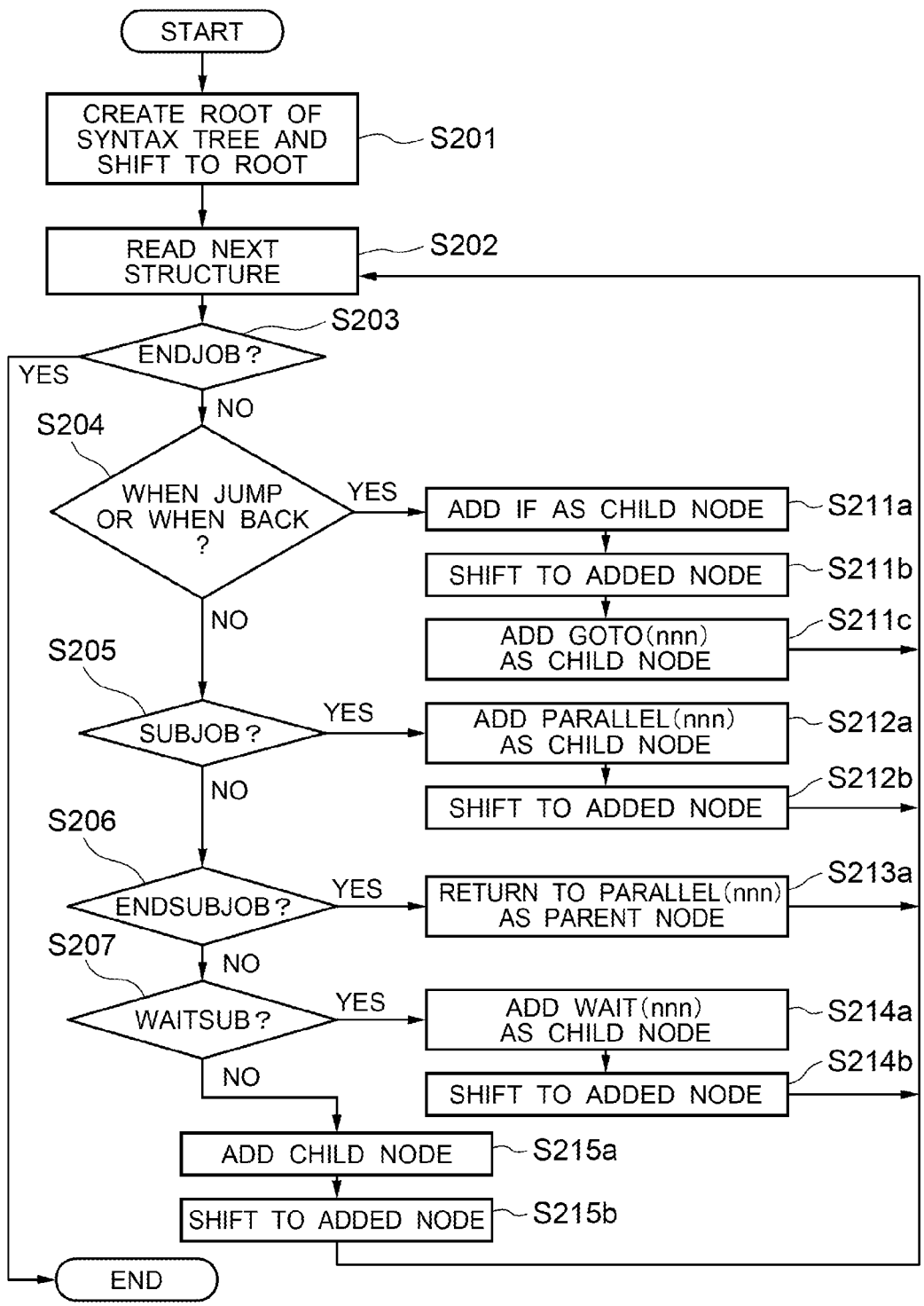
FIG. 11 is a flowchart showing the processing contents of the syntax tree creating device shown in FIG. 3.

As shown in FIG. 11, upon receiving the indexed file 101 managed by the file readout device 41, the syntax tree creating device 41 starts the processing for converting the file 101 to the syntax tree 102 of the tree structure. This will be described specifically.

As shown in FIG. 9, when the syntax tree creating device 41 linearly scans the indexes 101a of the file 101 and searches the index 101a of "001", the syntax tree creating device 41 creates "ROOT" of the syntax tree 102 (step S201 of FIG. 11), and takes the "ROOT" as the start point of the syntax tree 102.

Then, the syntax tree creating device 41 continues scanning of the indexes 101a (step S202 of FIG. 11), and judges whether or not the index 101a of "002" is "ENDJOB" (step 203 of FIG. 11). When judged as NO, the syntax tree creating device 41 connects "002" to "ROOT" as a left child element. Further, the syntax tree creating device 41 continues scanning of the indexes 101a, and detects the index 101a of "003". The syntax tree creating device 41 judges whether or not the index 101a of 003" is "WHEN JUMP" or "WHEN BACK" (step 204 of FIG. 11).

When judging that the index 101a of "003" is "WHEN JUMP" or "WHEN BACK", the syntax tree creating device 41 adds "if" as a child node to a lower layer of "002" (step 211a of FIG. 11), moves the pointer to that "if" (step 211b of FIG. 11), and adds "goto (nnn)" as a child node to a lower layer of "if" (step S211c of FIG. 11). In this case, the node "goto (014)" and the node "004" are added. After ending the processing described above, the syntax tree creating device 41 shifts the processing to step S202 of FIG. 11.

The syntax tree creating device 41 executes the processing of steps S203 and S204 of FIG. 11, and further judges whether or not there is a new controller "SUBJOB" (step S205 of FIG. 11). When judging that there is the controller "SUBJOB", the syntax tree creating device 41 adds "parallel (nnn)" as a child node (step S212a of FIG. 11). Further, taking it as "parallel (007)", the syntax tree creating device 41 adds "009" and "007" as child nodes (step S212b of FIG. 11).

The syntax tree creating device 41 shifts the processing to step S204 of FIG. 11 to judge whether or not there is a controller "WHEN JUMP" or "WHEN BACK". When judging that there is the controller "WHEN JUMP" or "WHEN BACK", the syntax tree creating device 41 adds "if" as a child node (step S211a of FIG. 11), shifts to "011" that is added to that "if" (step S211b of FIG. 11), and adds "parallel (016)" as a child node (step S211c of FIG. 11).

The syntax tree creating device 41 shifts the processing to step S206 of FIG. 11 to judge whether or not there is a controller "ENDSUBJOB". When judging that there is the controller "ENDSUBJOB", the syntax tree creating device 41 returns to "parallel (007)" as a parent node (step S213a of FIG. 11), and then shifts the processing to step S207 of FIG. 11. Further, when judging that there is a controller "WAITSUB", the syntax tree creating device 41 adds "wait (007)" as a child node (step S214a of FIG. 11). Further, the syntax tree creating device 41 adds the node "013", and shifts to that node (step S214b of FIG. 11).

The syntax tree creating device 41 adds the nodes "014", "015, "016", and "017" by repeating the processing of steps S215a and S215b of FIG. 11.

As described above, the syntax tree creating device 41 expresses the description content "ST001: ¥JOB" shown with the index 101a of "001" as "ROOT" based on the written expression rule, and expresses the description content "actual processing 1" shown with the index 101a of "002" as a tree structure. Similarly, the syntax tree creating device 41 linearly scans "003"–"018" which are the indexes 101a of the file 101 to convert the description contents (character string data 101b) to which the indexes 101a are applied into the syntax tree 102 of a tree structure.

The syntax tree 102 created by the syntax tree creating device 42 forms a tree structure which is in a form of hierarchical structure as shown in FIG. 10. The tree structure of the syntax tree 102 will be described. As shown in FIG. 10, having the index of "ROOT" as the highest layer, the following index "002" is located at a next hierarchical layer as a left child element (left) 102a2, the index "if" is connected to the index "002" at a next hierarchical layer as the left child element (left) 102a2, the index "004" is connected to the index "if" as a left child element (left) 102a2 while the index "014" is connected to the index "if" as a right child element (right) 102a3 at a next hierarchical layer, respectively, the index "parallel" is connected to the index "004" at a next hierarchical layer as a left child element (left) 102a2, and the index "009" is connected to the index "parallel" as a left child element (left) 102a2 while the index "007" is connected to the index "parallel" as a right child element (right) 102a3 at a next hierarchical layer, respectively. The following indexes "if"-"END" are connected as the left child elements (left) or the right child element (right) in order as the hierarchical structure.

The syntax tree optimizing device 43 optimizes the syntax tree 102 of the tree structure inputted from the syntax tree creating device 42 as the flowchart based on the optimization rules described above. This will be described in a specific manner by referring to FIG. 12.

Figure 12:
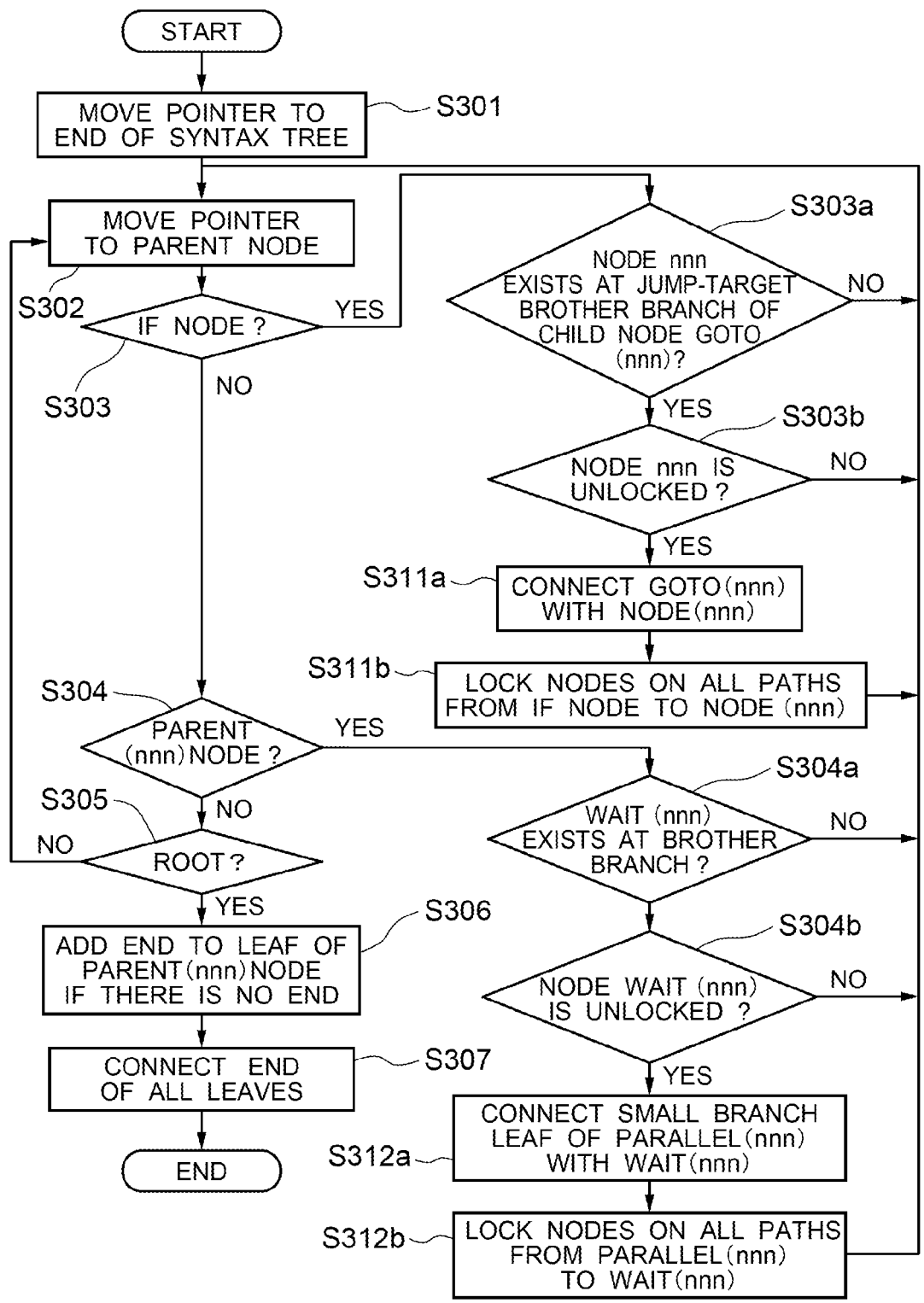
FIG. 12 is a flowchart showing the processing contents of a syntax tree optimizing device shown in FIG. 3.

The syntax tree optimizing device 43 searches "END" within the tree structure of the syntax tree 102 shown in FIG. 10 (step S301 of FIG. 12). Then, as shown in FIG. 13, the syntax tree optimizing device 43 starts a search of the tree structure of the syntax tree 102 shown in FIG. 10 in the direction towards "ROOT" by having the searched "END" as the start point of the optimization "END node 351", and first detects "if node 352" as shown in FIG. 13 (steps S302, S303 of FIG. 12).

The syntax tree optimizing device 43 judges whether or not there is a node "016" as a jump-target node of the node "goto (016)" for the node "if" on brother branches, (step S303a of FIG. 12). As shown in FIG. 14, the syntax tree optimizing device 43 recognizes that the rule 2 is applicable by referring to the rules when detecting "if 352", and executes connecting processing of "goto (016)" with the node "016" (steps S303b, S311a of FIG. 12). Further, as shown in FIG. 14, the syntax tree optimizing device 43 locks the nodes "015"-"011" on all the paths between "goto (016)" and the node "016" (step S311b of FIG. 12).

As shown in FIG. 15, when completing the processing shown in FIG. 14, the syntax tree optimizing device 43 starts a search and detects "parallel" from the syntax tree 102 shown in FIG. 10 (step S304 of FIG. 12). As shown in FIG. 15, the syntax tree optimizing device 43 recognizes that the rule 3 is applicable by referring to the rules when detecting "parallel (007) 354", and executes connecting processing of the node "007" with the node "wait (007)" (steps FIG. S304a, S304b, S312a of FIG. 12). In this case, the node "wait (007)" is in the lock state 353 as shown in FIG. 14, so that the syntax optimizing device 43 stops the connecting processing of the node "007" with the node "wait (007)" (step S312b of FIG. 12).

As shown in FIG. 16, the syntax tree optimizing device 43 re-starts a search after stopping the connecting processing in FIG. 15, and detects next "if" (step S303 of FIG. 12). As shown in FIG. 16, the syntax tree optimizing device 43 recognizes that the rule 2 is applicable by referring to the rules when detecting "if 355", and executes connecting processing of the node "014" with "goto (014)" (steps S303a, S303b, S311a). In this case, the node "014" is in the lock state 353 as shown in FIG. 14, so that the syntax optimizing device 43 stops the connecting processing of the node "014" with "goto (014)" (step S311b of FIG. 12).

As shown in FIG. 17, after stopping the connecting processing in FIG. 16, the syntax tree optimizing device 43 recognizes that the rule 4 is applicable by referring to the rules, and complements "END" to the node "007" that is a child leaf of "parallel 354" (steps S305, S306 of FIG. 12). Further, as shown in FIG. 17, the syntax tree optimizing device 43 recognizes that the rule 5 is applicable by referring to the rules, and converts "goto (014)" to the hierarchical structure 357 of the nodes "014"-"END 351".

As shown in FIG. 18, when completing the processing in FIG. 17, the syntax tree optimizing device 43 executes the processing for connecting "END" of the leaf complemented in FIG. 17 to "END 351" as the start point of the search to optimize the syntax tree 102 shown in FIG. 10 to the flowchart 22 shown in FIG. 19 (step S307 of FIG. 12). Thereby, the optimization processing is ended.

As shown in FIG. 20, upon detecting the controller "START" and the controller "if" of the flowchart 22, the file dividing device 44 recognizes the index "002" existing between those controllers. Under that recognition, the file dividing device 44 takes the description content "actual processing 1" of the line of the JCL file 101 to which the index 101a of "002" is applied as a single file, and divides it from the JCL file 101 as an individual file.

As shown in FIG. 20, upon detecting the controller "if" and the controller "parallel" of the flowchart 22, the file dividing device 44 recognizes the index "004" existing between those controllers. Under that recognition, the file dividing device 44 takes the description content "actual processing 2" of the line of the JCL file 101 to which the index 101a of "004" is applied as a single file, and divides it from the JCL file 101 as an individual file.

As shown in FIG. 20, upon detecting the controller "parallel" and the controller "if" of the flowchart 22, the file dividing device 44 recognizes the index "009" existing between those controllers. Under that recognition, the file dividing device 44 takes the description content "actual processing 4" of the line of the JCL file 101 to which the index 101a of "009" is applied as a single file, and divides it from the JCL file 101 as an individual file.

As shown in FIG. 20, upon detecting the controller "if" and the controller "wait (007)" of the flowchart 22, the file dividing device 44 recognizes the index "011" existing between those controllers. Under that recognition, the file dividing device 44 takes the description content "actual processing 5" of the line of the JCL file 101 to which the index 101a of "011" is applied as a single file, and divides it from the JCL file 101 as an individual file.

As shown in FIG. 20, upon detecting the controller "wait (007)" and the controller "divergence point P1 of the network having if as start point" of the flowchart 22, the file dividing device 44 recognizes the indexes "013, 014, 015" existing between those controllers. Under that recognition, the file dividing device 44 takes the description content "actual processing 6, 7, 8" of the lines of the JCL file 101 to which the indexes 101a of "013, 014, 015" are applied as a single file, and divides it from the JCL file 101 as an individual file.

As shown in FIG. 20, upon detecting the controller "divergence point P1 of the network having if as start point" and the controller "END" of the flowchart 22, the file dividing device 44 recognizes the indexes "016, 017" existing between those controllers. Under that recognition, the file dividing device 44 takes the description content "actual processing 9, 10" of the lines of the JCL file 101 to which the indexes 101a of "016, 017" are applied as a single file, and divides it from the JCL file 101 as an individual file.

As shown in FIG. 20, the file dividing device 44 detects the controller "parallel" by having the controller "END" of the flowchart 22 as the start point, and then detects a network that is in parallel to the network configured with the indexes 101a of "009, 011, 007, 013, 014, 015, 016, 017". Upon detecting the network, the file dividing device 44 recognizes the index "007" existing between the controller "parallel" and the controller "END". Under that recognition, the file dividing device 44 takes the description content "actual processing 3" of the line of the JCL file 101 to which the index 101a of "007" is applied as a single file, and divides it from the JCL file 101 as an individual file.

As shown in FIG. 20, the file dividing device 44 detects the controller "if" that is on the closer side of the controller "START" than the controller "parallel" by having the controller "END" of the flowchart 22 as the start point, and then detects a network that is in parallel to the network configured with the indexes 101a of "004, 009, 011, 007, 013, 014, 015, 016, 017". Upon detecting the network, the file dividing device 44 recognizes the indexes "014, 015, 016, 017" existing between the controller "if" and the controller "END". Under that recognition, the file dividing device 44 takes the description content "actual processing 7, 8, 9, 10" of the lines of the JCL file 101 to which the index 101a of "014, 015, 016, 017" are applied as a single file, and divides it from the JCL file 101 as an individual file.

The JCL file input device 51 receives the files 23 divided by the file dividing device 44, and outputs those to the script file creating device 52. The script file creating device 52 converts the JCL file 23 received from the JCL file input device 51 into the script file 24 by using the conversion dictionary 54. The script file output device 53 stores the script file 24 received from the script file creating device 52 in the HDD 12.

The exemplary embodiment is structured to divide the JCL file by excluding the parallel execution instruction and the order control instruction, and then to convert it to the file structure of a job network form. Thus, the conversion can be performed effectively. This makes it possible to create the file structure of a simple job network form that is of high maintenance property.

Further, the exemplary embodiment is designed to include the actual processing line conversion section for converting the language of the actual processing description written in the files divided by the file dividing device into a command interpreter language. Thus, it is possible to easily create the script file that can be interpreted by a general-purpose OS from the divided files separated from the flowchart.

Furthermore, the file dividing device outputs the flowchart obtained by optimizing the tree structure of the syntax tree in addition to outputting the divided files. Thus, the actual processing line conversion part can easily convert the divided JCL files into the script file. Therefore, conversion of the JCL file into the job network, which has mainly been done manually, can be effectively automated. This makes it possible to greatly cut the cost, time, and the like required for making transition from the mainframe of the computer system into an open system.

Further, the syntax tree optimizing device optimizes the syntax tree as a flowchart of a network form in which the start point and the end point are fixed. Thus, the created network job is in a simple flow of high maintenance property, so that job monitoring and job correcting work after transition can be done extremely easily. This further improves the maintenance property after the transition greatly. In particular, the maintenance workability of the job operation with a typical job management tool can be improved.

As an exemplary advantage according to the invention, the present invention is structured to divide the JCL file by excluding the parallel execution instructions and the order control instructions first and then to convert those into a file structure of a job network form. Therefore, the conversion can be performed effectively. This makes it possible to create the file structure of a simple network form that is of high maintenance property.

While the present invention has been described by referring the specific exemplary embodiment shown in the drawings, the present invention is not limited only to the exemplary embodiment shown in the drawings. It is to be understood that the present invention can employ any known structures as long as the effects of the present invention can be achieved therewith.

The Whole or Part of the Exemplary Embodiments Disclosed Above can be Described as, but not Limited to, the Following Supplementary Notes.

(Supplementary note 1) A file conversion device which converts a file form written in a given language to a file form that can be interpreted by another language, the device comprising: a file readout device which reads description contents of an inputted file by each line, and manages the description contents by adding an index to each line of the read description contents; a syntax tree creating device which converts the description contents into a syntax tree of a tree structure based on the indexes through linearly scanning the indexes of the file managed by the file readout device; a syntax tree optimizing device which optimizes the tree structure of the syntax tree as a flowchart according to an optimization rule; and a file dividing device which divides the inputted file by having controllers in the flowchart optimized by the syntax tree optimizing device as identifiers.

(Supplementary note 2) The file conversion device according to Supplementary note 1, further comprising an actual processing line conversion section which converts a language of an actual processing description written in the files divided by the file dividing device into a command interpreter language.

(Supplementary note 3) The file conversion device according to Supplementary note 1, wherein the file dividing device further outputs the flowchart that is obtained by optimizing the tree structure of the syntax tree in addition to outputting the divided files.

(Supplementary note 4) The file conversion device according to Supplementary note 1, wherein the syntax tree optimizing device optimizes the syntax tree as the flowchart of a network form in which a start point and an end point are fixed.

(Supplementary note 5) A file conversion method for converting a file form written in a given language to a file form that can be interpreted by another language, the method comprising: reading description contents of an inputted file by each line, and managing the description contents by adding an index to each line of the read description contents; converting the description contents into a syntax tree of a tree structure based on the indexes through linearly scanning the indexes of the managed file; optimizing the tree structure of the syntax tree as a flowchart according to an optimization rule; and dividing the inputted file by having controllers in the flowchart as identifiers.

(Supplementary note 6) The file conversion method according to Supplementary note 5, further comprising: converting a language of an actual processing description written in the divided files into a command interpreter language.

(Supplementary note 7) The file conversion method according to Supplementary note 5, further comprising: outputting the flowchart that is obtained by optimizing the tree structure of the syntax tree in addition to outputting the divided files.

(Supplementary note 8) The file conversion method according to Supplementary note 5, wherein the syntax tree is optimized as the flowchart of a network form in which a start point and an end point are fixed.

(Supplementary note 9) A computer readable recording medium storing a file conversion program for causing a computer, which configures a file conversion device that converts a file form written in a given language to a file form that can be interpreted by another language, to execute: a function which reads description contents of an inputted file by each line, and manages the description contents by adding an index to each line of the read description contents; a function which converts the description contents into a syntax tree of a tree structure based on the indexes through linearly scanning the indexes of the managed file; a function which optimizes the tree structure of the syntax tree as a flowchart according to an optimization rule; and a function which divides the inputted file by having controllers in the flowchart as identifiers.

(Supplementary note 10) The computer readable recording medium storing the file conversion program according to Supplementary note 9, which further causes the computer to execute a function which converts a language of an actual processing description written in the divided files into a command interpreter language.

(Supplementary note 11) A file conversion device which converts a file form written in a given language to a file form that can be interpreted by another language, the device comprising: file readout device means for reading description contents of an inputted file by each line, and managing the description contents by adding an index to each line of the read description contents; syntax tree creating means for converting the description contents into a syntax tree of a tree structure based on the indexes through linearly scanning the indexes of the file managed by the file readout device; syntax tree optimizing means for optimizing the tree structure of the syntax tree as a flowchart according to an optimization rule; and file dividing means for dividing the inputted file by having controllers in the flowchart optimized by the syntax tree optimizing device as identifiers.

INDUSTRIAL APPLICABILITY

As described above, the present invention makes it possible to convert the JCL file into the job network effectively. Therefore, the present invention is extremely effective for making transition from the main frame of the computer system to the open system.

What is claimed is:

1. A file conversion device which converts a file form written in a given language to a file form that can be interpreted by another language, the device comprising:
    a memory; and
    a processor configured to execute:
    a file input section which inputs a first file written in the given language;
    a job network creating section; and
    an actual processing line conversion section,
    wherein the job network creating section comprises:
        a file readout device which reads description contents of the inputted first file by each line, and manages the description contents by adding an index to each line of the read description contents;
        a syntax tree creating device which converts the description contents into a syntax tree of a tree structure based on the indexes through linearly scanning the indexes of the file managed by the file readout device;
        a syntax tree optimizing device which optimizes the tree structure of the syntax tree as a flowchart by searching divergence points according to a parallel execution instruction or an order control instruction of the syntax tree from an end of the converted syntax tree, judging whether or not nodes diverged at the branching points are connectable, and connecting the nodes when the nodes are connectable; and
        a file dividing device which divides the inputted file by having controllers in the flowchart optimized by the syntax tree optimizing device as identifiers,
    wherein the actual processing line conversion section converts a language of an actual processing description written in the files divided by the file dividing device into a command interpreter language.

2. The file conversion device as claim in claim 1, wherein the file dividing device further outputs the flowchart that is obtained by optimizing the tree structure of the syntax tree in addition to outputting the divided files.

3. A file conversion method for converting a file form written in a given language to a file form that can be interpreted by another language, the method comprising:
    inputting a first file written in the given language;
    reading description contents of the inputted first file by each line, and managing the description contents by adding an index to each line of the read description contents;
    converting the description contents into a syntax tree of a tree structure based on the indexes through linearly scanning the indexes of the managed file;
    optimizing the tree structure of the syntax tree as a flowchart by searching divergence points according to a parallel execution instruction or an order control instruction of the syntax tree from an end of the converted syntax tree, judging whether or not nodes diverged at the branching points are connectable, and connecting the nodes when the nodes are connectable;
    dividing the inputted file by having controllers in the optimized flowchart as identifiers; and
    converting a language of an actual processing description written in the divided files into a command interpreter language.

4. The file conversion method as claim in claim 3, further comprising:
    outputting the flowchart that is obtained by optimizing the tree structure of the syntax tree in addition to outputting the divided files.

5. A file conversion device which converts a file form written in a given language to a file form that can be interpreted by another language, the device comprising:
    a memory; and
    a processor configured to execute:
    a file input section which inputs a first file written in the given language;
    a job network creating section; and
    an actual processing line conversion section,
    wherein the job network creating section comprises:
        file readout device means for reading description contents of the inputted first file by each line, and managing the description contents by adding an index to each line of the read description contents;
        syntax tree creating means for converting the description contents into a syntax tree of a tree structure based on the indexes through linearly scanning the indexes of the file managed by the file readout device;
        syntax tree optimizing means for optimizing the tree structure of the syntax tree as a flowchart by searching divergence points according to a parallel execution instruction or an order control instruction of the syntax tree from an end of the converted syntax tree, judging whether or not nodes diverged at the branching points are connectable, and connecting the nodes when the nodes are connectable and
        file dividing means for dividing the inputted file by having controllers in the flowchart optimized by the syntax tree optimizing device as identifiers,
    wherein the actual processing line conversion section converts a language of an actual processing description written in the files divided by the file dividing device into a command interpreter language.

6. A non-transitory computer readable recording medium storing a program for performing a control for converting a file form written in a given language to a file form that can be interpreted by another language, the program causing a computer to perform:
    a function of inputting a first file written in the given language;
    a function of reading description contents of the inputted first file by each line, and managing the description contents by adding an index to each line of the read description contents;
    a function of converting the description contents into a syntax tree of a tree structure based on the indexes through linearly scanning the indexes of the managed file;
    a function of optimizing the tree structure of the syntax tree as a flowchart by searching divergence points according to a parallel execution instruction or an order control instruction of the syntax tree from an end of the converted syntax tree, judging whether or not nodes diverged at the branching points are connectable, and connecting the nodes when the nodes are connectable;
    a function of dividing the inputted file by having controllers in the optimized flowchart as identifiers; and
    a function of converting a language of an actual processing description written in the divided files into a command interpreter language.

* * * * *